(12) United States Patent
Kim

(10) Patent No.: US 12,504,460 B2
(45) Date of Patent: Dec. 23, 2025

(54) DISPLAY PANEL INSPECTION DEVICE EVALUATING LIGHT DETECTION CHARACTERISTICS

(71) Applicant: SAMSUNG DISPLAY CO., LTD., Yongin-si (KR)

(72) Inventor: Chul Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/659,608

(22) Filed: May 9, 2024

(65) Prior Publication Data

US 2025/0138077 A1    May 1, 2025

(30) Foreign Application Priority Data

Oct. 26, 2023    (KR) .......................... 10-2023-0144909

(51) Int. Cl.
*G01R 31/26* (2020.01)
*G09G 3/20* (2006.01)
*G09G 3/3233* (2016.01)

(52) U.S. Cl.
CPC ....... *G01R 31/2635* (2013.01); *G09G 3/2092* (2013.01); *G09G 3/3233* (2013.01); *G09G 2300/0819* (2013.01); *G09G 2300/0842* (2013.01)

(58) Field of Classification Search
CPC ........................... G01R 31/2635; G09G 3/2092
See application file for complete search history.

(56) References Cited

U.S. PATENT DOCUMENTS

| 10,398,324 | B2 | 9/2019 | Mukkamala et al. |
| 2018/0005556 | A1* | 1/2018 | Xu .......... G09G 3/3225 |
| 2021/0158751 | A1 | 5/2021 | Cha et al. |
| 2022/0206348 | A1* | 6/2022 | Lee .......... G02F 1/1368 |
| 2023/0341455 | A1* | 10/2023 | Liu .......... G01R 31/2635 |
| 2024/0046869 | A1 | 2/2024 | Kim |

FOREIGN PATENT DOCUMENTS

| KR | 10-2021-0064483 A | 6/2021 |
| KR | 10-2021-0066093 A | 6/2021 |

* cited by examiner

*Primary Examiner* — Roy P Rabindranath
(74) *Attorney, Agent, or Firm* — F. CHAU & ASSOCIATES, LLC

(57) ABSTRACT

The present disclosure relates to a display panel inspection device. According to an embodiment of the disclosure, an inspection device includes a loading plate on which a display device is disposed, a reflective plate disposed along a first or second direction to face a display panel of the display device, and a light characteristics inspection control unit controlling a light emitting driving of the display panel and detecting light sensing signals through the display panel to inspect light detection characteristics of the display panel. The light characteristics inspection control unit is configured to inspect the light detection characteristics of the display panel by converting the light sensing signals into light sensing data in units of at least one frame and comparing the light sensing data in units of at least one frame with reference frame data.

20 Claims, 12 Drawing Sheets

DISPLAY PANEL INSPECTION DEVICE EVALUATING LIGHT DETECTION CHARACTERISTICS

CROSS-REFERENCE TO RELATED APPLICATION

This application claims priority from Korean Patent Application No. 10-2023-0144909, filed on Oct. 26, 2023 in the Korean Intellectual Property Office, and all the benefits accruing therefrom under 35 U.S.C. § 119, the contents of which is incorporated by reference herein in its entirety.

1. TECHNICAL FIELD

The present disclosure relates to a display panel and, more particularly, to a display panel inspection device evaluating light detection characteristics.

2. DISCUSSION OF THE RELATED ART

As an information society develops, the demand for a display device for displaying an image is increasing in various forms. The display devices have been applied to various electronic devices such as smartphones, digital cameras, notebook computers, tablet PCS, navigation systems, and smart televisions.

Since privacy information is stored in portable display devices such as smartphones and tablet PCs, the portable display devices are equipped with various recognition and authentication functions including user's biometric information such as fingerprint recognition and facial recognition to protect the privacy information.

In addition, methods for more conveniently acquiring biometric information about health are being developed. For example, efforts are being made to combine the portable display devices such as smartphones and tablet PCs with portable blood pressure measuring devices.

The portable display devices can recognize some biometric information such as a user's fingerprint, using optical, ultrasonic, or capacitive methods. For example, when using an optical method, the portable display device detects various biological signals such as pulse wave signals in addition to the user's fingerprint. The optical method applied to the portable display device detects characteristics of the user's fingerprint using characteristics of the amount of light reflected from the user's fingerprint. In addition, various biological signals, such as pulse wave signals, may be detected using changes in the amount of light reflected from various body parts in addition to fingers.

SUMMARY

According to an embodiment of the disclosure, an inspection device includes a loading plate on which a display device is disposed, a reflective plate disposed along a first or second direction to face a display panel of the display device, and a light characteristics inspection control unit controlling a light emitting driving of the display panel and detecting light sensing signals through the display panel to inspect light detection characteristics of the display panel. The light characteristics inspection control unit is configured to inspect the light detection characteristics of the display panel by converting the light sensing signals into light sensing data in units of at least one frame and comparing the light sensing data in units of at least one frame with reference frame data.

According to an embodiment of the disclosure, an inspection device includes a loading plate on which a display device is disposed, a reflective plate disposed along a first or second direction to face a display panel of the display device, a light characteristics inspection control unit controlling a light emitting driving of the display panel and detecting light sensing signals through the display panel to inspect light detection characteristics of the display panel, a plate arrangement unit switching an arrangement direction of the reflective plate to the first direction or the second direction and arranging the reflective plate in a front direction of the display panel, and a chamber forming an internal space in which the loading plate, the reflective plate, and the plate arrangement unit are disposed, and creating a dark room environment in the internal space. The light characteristics inspection control unit inspects the light detection characteristics of the display panel by converting the light sensing signals into light sensing data in units of at least one frame and comparing the light sensing data in units of at least one frame with reference frame data.

According to an embodiment of the disclosure, an inspection device includes a loading plate on which a display device is disposed, a reflective plate disposed along a first or second direction to face a display panel of the display device, a light characteristics inspection control unit controlling a light emitting driving of the display panel and detecting light sensing signals through the display panel to inspect light detection characteristics of the display panel, a plate arrangement unit switching an arrangement direction of the reflective plate to the first direction or the second direction and arranging the reflective plate in a front direction of the display panel, and a chamber forming an internal space in which the loading plate, the reflective plate, and the plate arrangement unit are disposed, and creating a dark room environment in the internal space. The reflective plate includes: a flat base substrate, a first reflective layer formed on a front surface, and a second reflective layer formed on a rear surface . . .

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

The present disclosure will now be described more fully hereinafter with reference to the accompanying drawings, in which embodiments of the disclosure are shown. This disclosure may, however, be embodied in different forms and should not be construed as necessarily limited to the embodiments set forth herein. Rather, these embodiments are provided so that this disclosure will be thorough and complete, and will filly convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be necessarily limited by these terms. These terms are only used to distinguish one element from another element. For instance, a first element discussed below could be termed a second element without departing from the teachings of the present disclosure. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, specific embodiments will be described with reference to the accompanying drawings.

Figure 1:
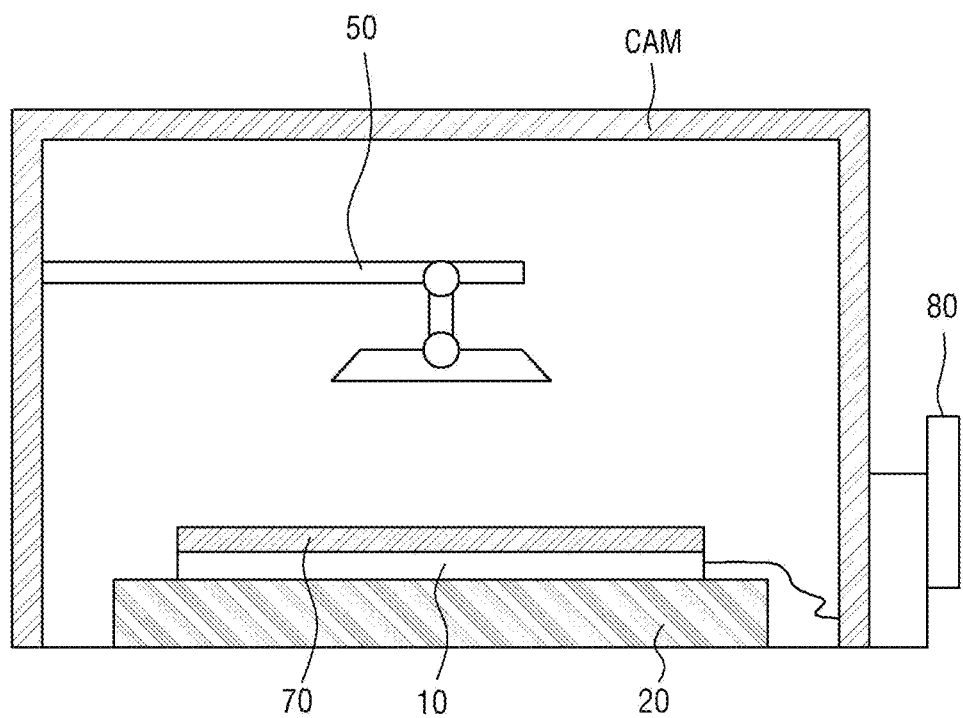
FIG. 1 is a cross-sectional configuration view illustrating a display panel inspection device according to an embodiment.

FIG. 1 is a cross-sectional configuration view illustrating a display panel inspection device according to an embodiment.

Referring to FIG. 1, an inspection device according to an embodiment includes a loading plate 20, a reflective plate 70, a plate arrangement unit 50, and a light characteristics inspection control unit 80. In addition, the inspection device according to an embodiment may further include a chamber CAM or the like that may cover the loading plate 20, the reflective plate 70, and the plate arrangement unit 50, or in which all of the loading plate 20, the reflective plate 70, and the plate arrangement unit 50 may be disposed.

For example, the chamber CAM may have an inspection space provided inside and may be formed as a three-dimensional structure with a polygonal shape so that the internal inspection space such as a dark room or vacuum may be created as an inspection environment. The loading plate 20, the reflective plate 70, the plate arrangement unit 50, etc. may be disposed in the internal inspection space of the chamber CAM.

The light characteristics inspection control unit 80 may be disposed on an inner side surface or an outer surface of the chamber CAM. An open/close door through which a display device 10 may move into a passage may be further formed on at least one side wall surface or an upper surface of the chamber CAM. The display device 10 moves inside or outside the chamber CAM through the open/close door and is loaded or unloaded on the loading plate 20 before and after light detection characteristics are inspected.

The loading plate 20 may be disposed in the inspection space inside the chamber CAM, for example, on a lower surface of the internal space of the chamber CAM. When inspecting the light detection characteristics of the display panel, the display device 10 is loaded on the loading plate 20 using a separate transfer device. For example, when inspecting the light detection characteristics of multiple display panels, multiple display devices 10 may be transferred by a transfer device or the like and loaded on the loading plate 20. Then, when the light detection characteristics inspection of the display panel is complete, the inspected display devices 10 are unloaded to the outside of the chamber CAM by a transfer device or an inspector.

When inspecting the light detection characteristics of the display panel, the reflective plate 70 is disposed on a front surface of the display panel or is disposed facing the display panel so as to be parallel to the display panel in a front direction of the display panel. When inspecting the light detection characteristics of multiple display panels, a large-area reflective plate 70 or multiple reflective plates 70 may be disposed on the front surfaces of the display panels or disposed in the front direction thereof.

When the reflective plate 70 completely covers the display device 10 or is seated on the front surface of the display device 10, including the display panel, external light is blocked in the front direction of the display panel, thereby forming a dark room environment in front of the display panel. Accordingly, even if the darkroom environment is not separately established using the chamber CAM or the like, the effect of establishing the darkroom environment may be achieved by disposing the reflective plate 70 on the front surface of the display device 10 and inspecting the display device 10.

The reflective plate 70 may be disposed along a first direction so that the front surface, which is a surface of the reflective plate 70, faces the front surface of the display panel, or may be disposed in a second direction so that a rear surface, which is the other surface of the reflective plate 70, overlaps the front of the display panel.

The reflective plate 70 includes a flat base substrate, a first reflective layer formed on a front surface, which is a surface of the base substrate, and a second reflective layer formed on a rear surface, which is an upper surface. The first reflective layer and the second reflective layer have different light reflectance. For example, the first reflective layer, which is black, may entirely cover the front surface of the base substrate, and the second reflective layer, which is white, may entirely cover the rear surface of the base substrate.

Accordingly, the reflective plate 70 may be disposed along the first direction so that the black first reflective layer faces the front surface of the display panel or may be disposed along the second direction so that the white second reflective layer faces the front surface of the display panel.

The plate arrangement unit 50 switches an arrangement direction of the reflective plate 70 to the first direction or the second direction and arranges the reflective plate 70 on the front surface or in the front of the display panel. The plate arrangement unit 50 may be disposed inside the chamber CAM, and the plate arrangement unit 50 may be formed as a structure of at least one robot arm. Unlike this, the plate arrangement unit 50 may be formed as a hoist structure including a plate suction plate, a bracket, a rotating shaft, a wire, a support frame, a rolling member, a motor, etc.

The plate arrangement unit 50 supports both side surfaces, or the front or rear surface of the reflective plate 70 and switches the arrangement direction of the reflective plate 70 to the first or second direction. Moreover, the plate arrangement unit 50 disposes the reflective plate 70 on the front surface of the display panel along the first or second direction. In addition, the plate arrangement unit 50 may support both side surfaces, or the front or rear surface of the reflective plate 70 and disposes the reflective plate 70 in the front direction of the display panel along the first or second direction. For example, the plate arrangement unit 50 may arrange and fix the reflective plate 70 in the front direction facing the display panel to be in parallel with the display panel.

The light characteristics inspection control unit 80 supplies drive control signals, light emitting data, and power signals and drives the display panel and the display device 10 to the display device 10 and controls light emitting driving of the display panel to detect light sensing signals through the display panel.

For example, the light characteristics inspection control unit 80 supplies driving control signals for controlling the driving timing of the display pixels SP and light sensing pixels of the display panel, light emitting data for setting light emitting luminance of the display pixels SP, and high and low potential driving voltages to the display device 10. In addition, the light characteristics inspection control unit 80 receives the light sensing signals detected through light sensing pixels of the display panel through the display device 10.

The light characteristics inspection control unit 80 sequentially converts the light sensing signals received through the display device 10 into digital data in units of at least one frame period and generates light sensing data in units of at least one frame. The light characteristics inspection control unit 80 may transform the light emitting luminance of the display pixels SP in units of at least one frame period and detect the light detection signals for each transformed light emitting luminance. Accordingly, the light characteristics inspection control unit 80 inspects the light detection characteristics of the display panels such as linear light detection characteristics and dynamic range of the display panels by graphing or databasing the light sensing data in units of at least one frame period in which the light emitting luminance is variable. In addition, the light characteristics inspection control unit 80 inspects the light detection characteristics of the display panels by comparing and analyzing the light sensing data of at least one frame with preset reference frame data. The light characteristics inspection control unit 80 may compare and analyze the light sensing data in units of at least one frame and the reference frame data for each display device 10. The light characteristics inspection control unit 80 then determines light detection characteristics of each display panel and assesses whether the display panel is a good product based on the analysis results.

Figure 2:
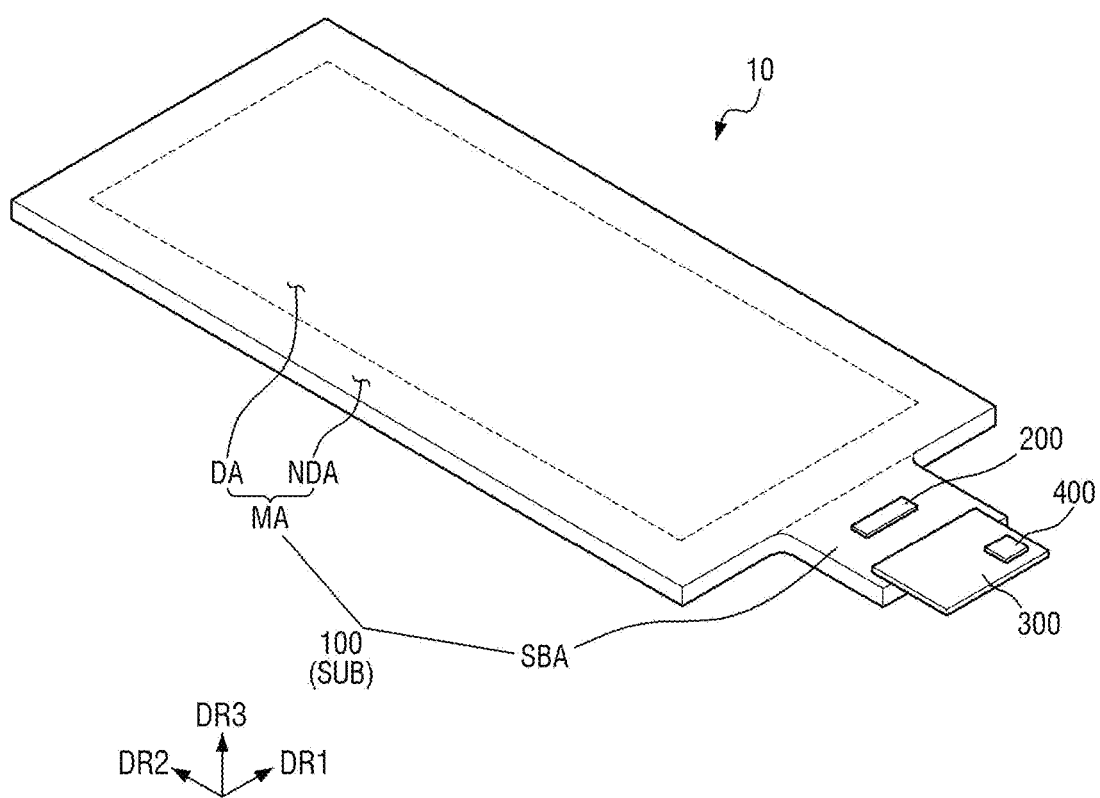
FIG. 2 is a perspective view illustrating a display device according to an embodiment illustrated in FIG. 1.
Figure 3:
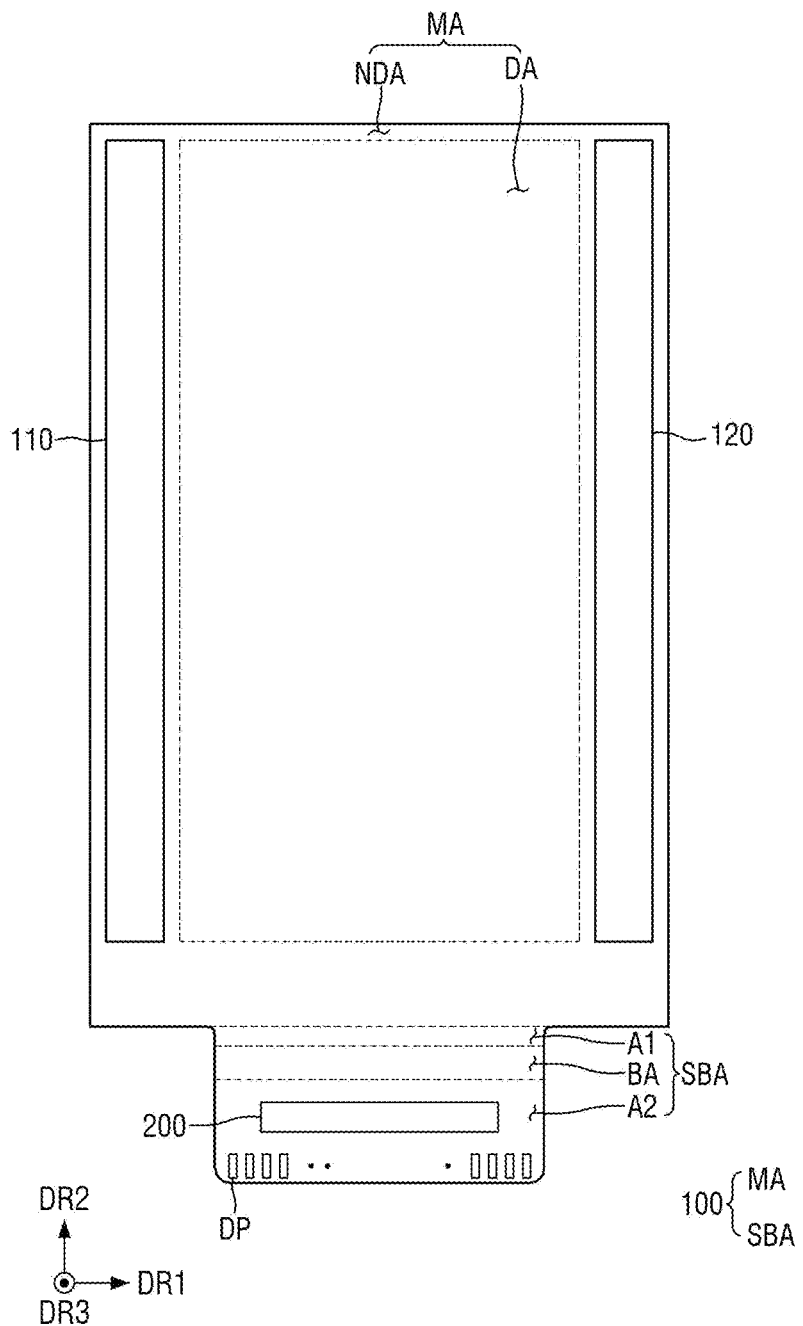
FIG. 3 is a plan view illustrating an arrangement structure of the display panel and display driving circuit illustrated in FIG. 2.

FIG. 2 is a perspective view illustrating a display device according to an embodiment. FIG. 3 is a plan view illustrating an arrangement structure of the display panel and display driving circuit illustrated in FIG. 2. In addition, FIG. 4 is a side view illustrating a configuration of the display device illustrated in FIGS. 2 and 3.

First, referring to FIGS. 2 and 3, a display device 10 according to an embodiment may be applied to portable electronic devices such as mobile phones, smartphones, tablet personal computers (PCs), mobile communication terminals, electronic notebooks, electronic books, portable multimedia players (PMPs), navigation systems, and ultra mobile PCs (UMPCs). In addition, the display device 10 according to an embodiment may be applied as a display unit of televisions, notebooks computers, monitors, billboards, or the Internet of Things (IoT) devices. In some embodiments, the display device 10 according to an embodiment may be applied to wearable devices such as a smart watch, a watch phone, a glasses-type display, and a head mounted display (HMD). In addition, the display device 10 according to an embodiment may be applied to a center information display (CID) disposed on an instrument board, a center fascia, or a dashboard of a vehicle, a room mirror display substituting for a side mirror of the vehicle, or a display disposed on a rear surface of a front seat as entertainment for a rear seat of the vehicle.

The display device 10 may be a light emitting display device such as an organic light emitting display device using an organic light emitting diode, a quantum dot light emitting display device including a quantum dot light emitting layer, an inorganic light emitting display device including an inorganic semiconductor, and a micro light emitting display device using a micro or nano light emitting diode (micro or nano LED). Hereinafter, it is mainly described that the display device 10 is the organic light emitting display device, but the present disclosure is not necessarily limited thereto.

Figure 4:
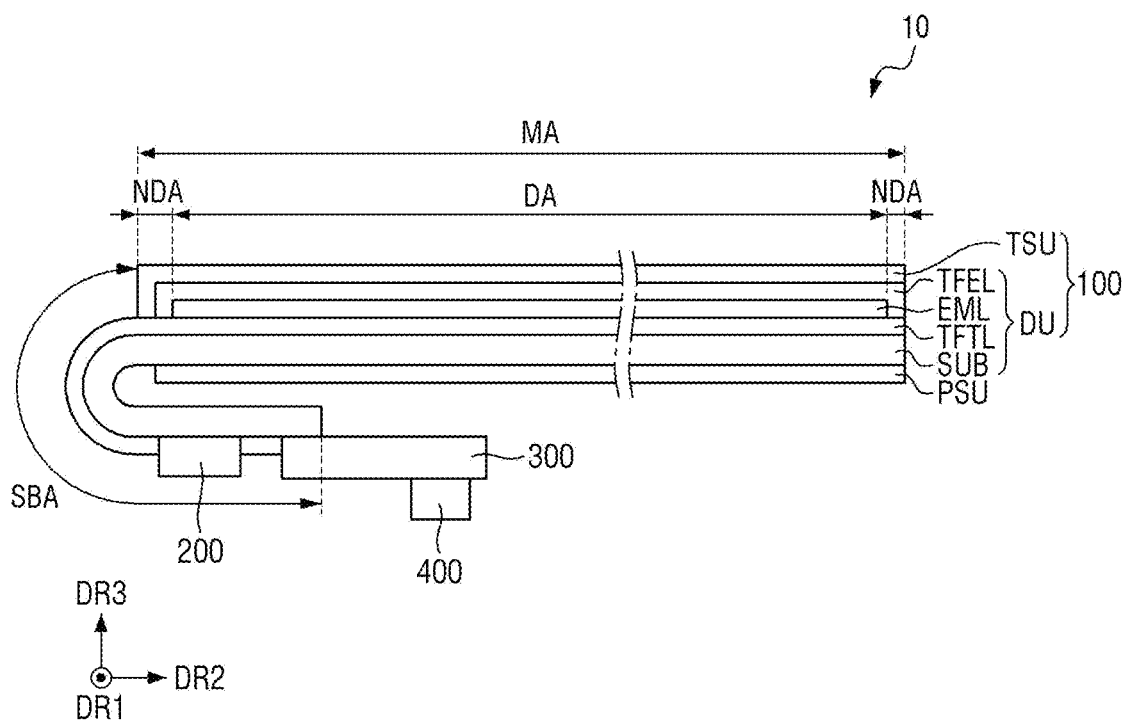
FIG. 4 is a side view illustrating a configuration of the display device illustrated in FIGS. 2 and 3.

Referring to FIGS. 2 and 4, the display device 10 includes a display panel 100, a main driving circuit 200, a touch sensing unit TSU, a pressure sensing unit PSU, a circuit board 300, and a touch driving circuit 400.

The display panel 100 may have a rectangle shape with a pair of shorter sides extending along a first direction DR1 and a pair of longer sides extending along a second direction DR2 intersecting the first direction DR1. A corner where the short side along the first direction DR1 and the long side along the second direction DR2 meet may be formed at right angle or may be rounded with a predetermined curvature. The planar shape of the display panel 100 is not necessarily limited to the quadrilateral shape, and may be formed in other shapes such as polygonal shapes, a circular shape, or an elliptical shape. The display panel 100 may be flat but is not necessarily limited thereto. For example, the display panel 100 may include curved surface units formed at left and right distal ends thereof with a constant curvature or a variable curvature. In addition, the display panel 100 may be flexible, bent, folded, or rolled.

A substrate SUB of the display panel 100 may include a main area MA and a sub-area SBA.

The main area MA may include a display area DA displaying an image and a non-display area NDA which is a peripheral area of the display area DA.

The non-display area NDA may be adjacent to the display area DA. The non-display area NDA may be an area outside the display area DA. The non-display area NDA may at least partially surround the display area DA. For example, the non-display area NDA may be an edge area of the display panel 100.

The display area DA includes display pixels SP that display images and light sensing pixels that sense light reflected from the user's body parts, such as the face or fingers. In addition, the display area DA may further include infrared light emitting pixels that emit infrared light.

The display area DA may occupy a majority of the main area MA. The display area DA may be disposed at the center of the main area MA.

The display area DA may also be divided into an image display area in which only the light sensing pixels are not disposed and only the display pixels SP are disposed, and a biometric information measurement area in which the display pixels and the light sensing pixels are mixed. For example, the light sensing pixels may be disposed together with the display pixels SP only in a preset unit of the biometric information measurement area out of the entire display area DA of the display panel 100. Hereinafter, an example in which display pixels SP and light sensing pixels are alternately arranged in the entire area of the display area DA will be described.

Referring to FIGS. 3 and 4, the sub-area SBA may protrude from one side of the main area MA along the second direction DR2. A length of the sub-area SBA along the second direction DR2 may be smaller than the length of the main area MA along the second direction DR2. A length of the sub-area SBA along the first direction DR1 may be smaller than a length of the main area MA along the first direction DR1. In some embodiments, the length of the sub-area SBA along the first direction DR1 may be substantially the same as the length of the main area MA along the first direction DR1.

The sub-area SBA may include a first area A1, a second area A2, and a bending area BA.

The first area A1 is an area protruding from one side of the main area MA along the second direction DR2. One side of the first area A1 may be in contact with a non-display area NDA of the main area MA, and the other side of the first area A1 may be in contact with the bending area BA. For example, the first area A1 may be disposed between the non-display area NDA of the main area MA and the bending area BA.

The second area A2 is an area in which pads DP and the main driving circuit 200 are disposed. The main driving circuit 200 may be attached to the driving pads in the second area A2 using a conductive adhesive such as an anisotropic conductive layer. The circuit board 300 may be attached to the pads DP in the second area A2 using a conductive adhesive. A side of the second area A2 may be in contact with the bending area BA.

The bending area BA is an area that is bent. When the bending area BA is bent, the second area A2 may be disposed below the first area A1 and below the main area MA. The bending area BA may be disposed between the first area A1 and the second area A2. For example, a side of the bending area BA may be in contact with the first area A1, and the other side of the bending area BA may be in contact with the second area A2.

As illustrated in FIG. 4, the sub-area SBA may be bent, and in this case, the sub-area SBA may be disposed below the main area MA. The sub-area SBA may overlap the main area MA in a third direction DR3.

A touch sensing unit TSU that senses body parts such as fingers and an electronic pen is formed or disposed on a front portion of the display panel 100. The touch sensing unit TSU may include a plurality of touch electrodes that senses a user's touch in a capacitive method.

The touch sensing unit TSU includes a plurality of touch electrodes arranged that intersects each other along the first and second directions DR1 and DR2. For example, the plurality of touch electrodes include a plurality of driving electrodes arranged to be in parallel with and spaced apart from each other along the first direction DR1, and a plurality of sensing electrodes arranged to be in parallel with and spaced apart from each other along the second direction DR2 that intersects the plurality of driving electrodes with an organic material layer or an inorganic material layer interposed therebetween. The plurality of driving electrodes and sensing electrodes may extend in a line area between the display pixels SP and the light sensing pixels so as not to overlap each of the display pixels SP and light sensing pixels arranged in the display area DA. The plurality of driving electrodes and sensing electrodes form mutual capacitance and transmit touch sensing signals that vary depending on the user's touch to the touch driving circuit 400.

The touch driving circuit 400 each supplies touch driving signals to the plurality of driving electrodes, and each receives the touch sensing signals from the plurality of sensing electrodes. In addition, the touch driving circuit 400 senses changes in mutual capacitance between the driving electrodes and the sensing electrodes based on a change in a size of the touch sensing signal. The touch driving circuit 400 generates touch data based on the changes in the mutual capacitance between the driving electrodes and the sensing electrodes and derives a touch sensed position. Accordingly, coordinate data of the touch sensed position may be supplied to the main driving circuit 200.

The pressure sensing unit PSU may be formed on a rear surface or a front surface of the substrate SUB and may sense pressure applied by a body part such as a finger. In some embodiments, the pressure sensing unit PSU may also be formed on a surface between the display unit DU and the touch sensing unit TSU. Here, the pressure sensing unit PSU is necessary when detecting absolute blood pressure-related measurement values but is not necessary when detecting relative blood pressure-related measurement values.

When the pressure sensing unit PSU is formed, the pressure sensing unit PSU may be formed as a transparent sheet type in which a plurality of transparent electrodes are arranged in vertical and horizontal directions. The pressure sensing unit PSU includes a plurality of pressure sensing electrodes that intersects each other along the first and second directions DR1 and DR2. The plurality of pressure sensing electrodes include a plurality of lower electrodes arranged to be in parallel with and spaced apart from each other along the first direction DR1, and a plurality of upper electrodes in parallel with and spaced apart from each other along the second direction DR2 that intersects the plurality of lower electrodes with a transparent inorganic (or organic) material layer interposed therebetween. The plurality of lower electrodes and upper electrodes form self-capacitance with the transparent inorganic (or organic) material layer interposed therebetween and transmit pressure sensing signals that vary depending on the user's touch pressure to the touch driving circuit 400. Such a pressure sensing unit PSU may be applied in various other structures in addition to the structure using the pressure sensing electrodes and is not necessarily limited to the description of FIG. 4.

The circuit board 300 may be attached to an end of the sub-area SBA. As a result, the circuit board 300 may be electrically connected to the display panel 100 and the main driving circuit 200. The display panel 100 and the main driving circuit 200 may receive digital video data, timing signals, and driving voltages through the circuit board 300. The circuit board 300 may be a flexible printed circuit board, a printed circuit board, or a flexible film such as a chip on film.

The main driving circuit 200 may generate electrical signals such as control signals and data voltages and drive the display panel 100. Each of the main driving circuit 200 and the touch driving circuit 400 may be formed as an integrated circuit (IC) and may be attached onto the display panel 100 or the circuit board 300 in a chip on glass (COG) manner, a chip on plastic (COP) manner, or an ultrasonic bonding manner, but is not necessarily limited thereto. For example, the main driving circuit 200 and the touch driving circuit 400 may also be attached onto the circuit board 300 in a chip on film (COF) manner.

When inspecting and evaluating the light detection characteristics of the display panel 100, the main driving circuit 200 receives driving control signals, light emitting data, high-potential and low-potential driving voltages, etc. from the light characteristics inspection control unit 80.

The main driving circuit 200 generates control signals and drives the display pixels SP and light sensing pixels of the display panel 100 based on the driving timing of the driving control signals. In addition, the main driving circuit 200 generates a data voltage that corresponds to the light emitting data from the light characteristics inspection control unit 80 and supplies the data voltage to the display pixels SP. The main driving circuit 200 controls the driving timing of the light sensing pixels while the display pixels SP emit light and receives light sensing signals from each light sensing pixel. The main driving circuit 200 sequentially supplies the light sensing signals received from each light sensing pixel to the light characteristics inspection control unit 80. Accordingly, the light characteristics inspection control unit 80 may receive the light sensing signals detected from the light sensing pixels through the main driving circuit 200 and sequentially convert the light sensing signals into digital data in units of at least one frame.

Figure 5:
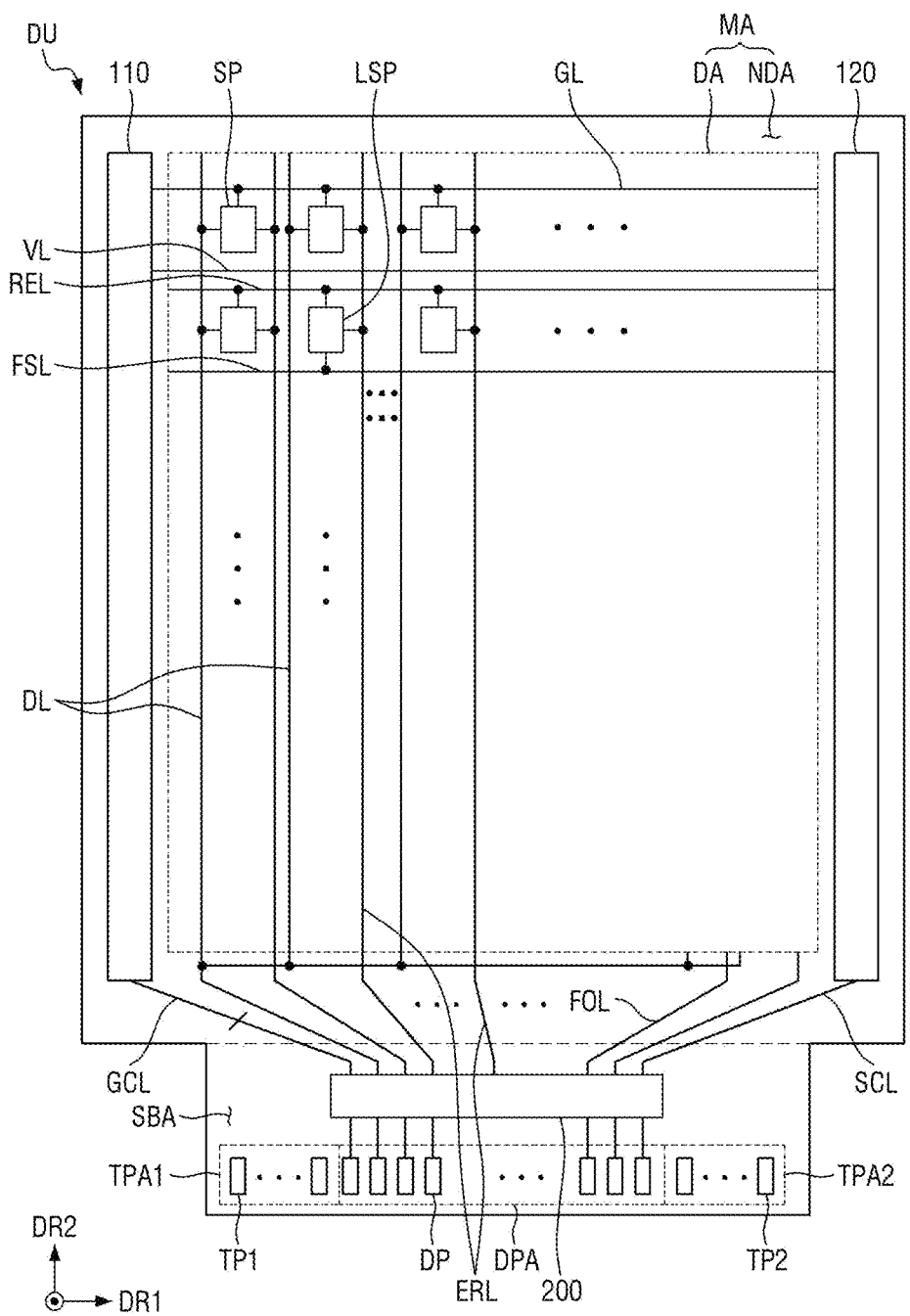
FIG. 5 is a layout view schematically illustrating an example of the display panel illustrated in FIGS. 2 to 4.

FIG. 5 is a layout view schematically illustrating an example of the display panel illustrated in FIGS. 2 to 4. Specifically, FIG. 5 is a layout view illustrating a display area DA and a non-display area NDA of the display unit DU before the touch sensing unit TSU is formed.

Referring to FIG. 5 together with FIG. 4, a display scan driving unit 110, a light sensing scan driving unit 120, and a main driving circuit 200 may be disposed on the display panel 100 of the display device 10 according to an embodiment. In addition, a touch driving circuit 400 and a power supply unit may be disposed on the circuit board 300 connected to the display panel 100. Here, the main driving circuit 200 and the touch driving circuit 400 may an integrally formed one-chip type and may be mounted on the display panel 100 or the circuit board 300. However, hereinafter, for convenience of functional explanation, an example in which the main driving circuit 200 and the touch driving circuit 400 are formed as different integrated circuits will be described.

Referring to FIG. 5, the display panel 100 may include display pixels SP, light sensing pixels LSP, display scan lines GL, light emitting control lines VL, data lines DL, light sensing scan lines FSL, sensing reset lines REL, and light sensing lines ERL that are disposed in the display area DA.

The display scan driving unit 110 and the light sensing scan driving unit 120 are each disposed in the non-display area NDA.

The display scan lines GL sequentially supply display scan signals applied in units of each horizontal line from the display scan driving unit 110 to the display pixels SP and light sensing pixels LSP for each horizontal line. The display scan lines GL may extend along the first direction DR1 and may be spaced apart from each other along the second direction DR2 intersecting the first direction DR1.

The light emitting control lines VL sequentially supply light emitting control signals applied from the display scan driving unit 110 in units of each horizontal line to the display pixels SP and light sensing pixels LSP for each horizontal line. The light emitting control lines VL may extend along the first direction DR1 in parallel with the display scan lines GL and may be spaced apart from each other along the second direction DR2 intersecting the first direction DR1.

The data lines DL may supply the data voltage received from the main driving circuit 200 to the plurality of display pixels SP. The plurality of data lines DL may extend along the second direction DR2 and may be spaced apart from each other along the first direction DR1.

The light sensing scan lines FSL sequentially supply sensing scan signals applied from the light sensing scan driving unit 120 in units of each horizontal line to the plurality of light sensing pixels LSP. The light sensing scan lines FSL may extend along the first direction DR1 and may be spaced apart from each other along the second direction DR2 intersecting the first direction DR1.

The sensing reset lines REL sequentially supply sensing reset signals applied from the light sensing scan driving unit 120 in units of each horizontal line to the plurality of light sensing pixels LSP for each horizontal line. The sensing rest lines REL may extend along the first direction DR1 in parallel with the light sensing scan lines FSL and may be spaced apart from each other along the second direction DR2 intersecting the first direction DR1.

The light sensing lines ERL are connected between each light sensing pixel LSP and the main driving circuit 200 and supply the light sensing signals output from each light sensing pixel LSP to the main driving circuit 200. The light sensing lines ERL may extend along the second direction DR2 along the arrangement direction of the main driving circuit 200 and may be spaced apart from each other along the first direction DR1.

The non-display area NDA may surround the display area DA. The non-display area NDA may include a display scan driving unit 110, a light sensing scan driving unit 120, fan out lines FOL, gate control lines GCL, and sensing control lines SCL.

The display pixels SP and the light sensing pixels LSP form each first unit pixel and may be arranged in a matrix form along the first direction DR1 and the second direction DR2 in the display area DA. When at least one infrared light emitting pixel is additionally disposed in the display area DA, the display pixels SP and at least one infrared light emitting pixel form each second unit pixel, and each second unit pixel may be arranged in a matrix form in the display area DA to alternate with each first unit pixel.

For example, three display pixels SP that respectively display red, green, and blue light and one light sensing pixel LSP may form a first unit pixel. In addition, three display pixels SP that respectively display red, green, and blue light and one infrared light emitting pixel may form a second unit pixel. The first unit pixels and the second unit pixels may be alternately arranged in a matrix form, creating either horizontal or vertical stripes. In some embodiments, the first unit pixels and the second unit pixels may be alternately arranged in a zigzag form on a plane or may also be arranged in a matrix form in one diagonal direction.

Each of the red, green, and blue display pixels SP and the infrared light emitting pixels may be connected to one of the display scan lines GL and one of the light emitting control lines VL. During the image display period, the red, green, and blue display pixels SP may emit light by receiving the data voltage of the data line DL based on the display scan signal of the display scan line GL and the light emitting control signal of the light emitting control line VL. The image display period also includes driving current to the light emitting device according to the data voltage. During the period of measuring biometric information such as blood pressure, heart rate, oxygen saturation, and blood vessel elasticity, the display pixels SP displaying at least one color among the red, green, and blue display pixels SP may display light by selectively receiving the data voltage for emitting light along with the display scan signal and the light emitting control signal. In addition, during the period of measuring biometric information such as blood pressure and heart rate, the infrared light emitting pixels may also display infrared light by selectively receiving the data voltage for emitting light along with the display scan signal and the light emitting control signal.

The light sensing pixels LSP may be arranged in the vertical or horizontal direction and alternate with the red, green, and blue display pixels SP. Each light sensing pixel LSP may be connected to one of the light sensing scan lines FSL, one of the sensing reset lines REL, and one of the light sensing lines ERL. During the period of measuring biometric information such as blood pressure, respiratory rate, oxygen saturation, and presence of cardiovascular disease, each light sensing pixel LSP may be reset in response to a sensing reset signal from the sensing reset lines REL and then generate and output a light sensing signal corresponding to the amount of reflected light incident from the front direction. In addition, each light sensing pixel LSP may transmit the light sensing signal to the light sensing line ERL in response to a sensing scan signal from the light sensing scan line FSL.

Meanwhile, the light sensing pixels LSP arranged in units of a horizontal line may be connected to one display scan line GL for each horizontal line. Each light sensing pixel LSP may generate a light sensing signal corresponding to the amount of reflected light incident from the front direction, and may output the light sensing signal to the light sensing line ERL in response to a display scan signal input through the display scan line GL.

The display scan driving unit 110 may be disposed in the non-display area NDA. The display scan driving unit 110 is illustrated as being disposed on one side (e.g., left side) of the display panel 100, but is not necessarily limited to the drawings of the present specification. For example, the display scan driving unit 110 may also be disposed on both sides (e.g., left and right sides) of the display panel 100.

The display scan driving unit 110 may be electrically connected to the main driving circuit 200 through the gate control lines GCL. The display scan driving unit 110 receives a scan control signal from the main driving circuit 200, generates display scan signals in units of horizontal line driving periods according to the scan control signal, and supplies the display scan signals to the display scan lines GL. In addition, the display scan driving unit 110 may generate light emitting control signals according to the scan control signal from the main driving circuit 200 and supply the light emitting control signals to the light emitting control lines VL.

The gate control line GCL may extend from the main driving circuit 200 to the display scan driving unit 110, and the length of the gate control line GCL may depend on the arrangement position of the display scan driving unit 110. The gate control line GCL may supply the scan control signal received from the main driving circuit 200 to the display scan driving unit 110.

The light sensing scan driving unit 120 may be disposed in a non-display area NDA different from the display scan driving unit 110. It is illustrated in FIG. 5 that the light sensing scan driving unit 120 is disposed on the opposite side (e.g., right side) of the display panel 100 where the display scan driving unit 110 is disposed, but the present disclosure is not necessarily limited thereto. The light sensing scan driving unit 120 may be electrically connected to the main driving circuit 200 through light sensing control lines SCL. The light sensing scan driving unit 120 receives the light sensing control signal from the main driving circuit 200 and generates reset control signals and sensing scan signals based on the light sensing control signal in units of horizontal line driving periods. In addition, the light sensing scan driving unit 120 supplies the sequentially generated reset control signals to the sensing reset lines REL. In addition, the light sensing scan driving unit 120 may generate sensing scan signals according to the light sensing control signal from the main driving circuit 200 and supply the sensing scan signal to the sensing scan lines FSL.

The light sensing control line SCL may extend from the main driving circuit 200 to the light sensing scan driving unit 120, and the length of the light sensing control line SCL may depend on the arrangement position of the light sensing scan driving unit 120. The light sensing control line SCL may supply the light sensing control signal received from the main driving circuit 200 to the light sensing scan driving unit 120.

The sub-area SBA may include a main driving circuit 200, a display pad area DPA, and first and second touch pad areas TPA1 and TPA2. The display pad area DPA, the first touch pad area TPA1, and the second touch pad area TPA2 may be disposed at an edge of the sub-area SBA. The display pad area DPA, the first touch pad area TPA1, and the second touch pad area TPA2 may be electrically connected to the circuit board 300 using an anisotropic conductive layer or a low-resistance and high-reliability material such as super-absorbent polymer (SAP).

The fan-out lines FOL may extend from the main driving circuit 200 to the display area DA. In addition, the fan-out lines FOL may be connected to the plurality of data lines DL so that the data voltage received from the main driving circuit 200 may be supplied to the plurality of data lines DL.

The main driving circuit 200 may output signals and voltages and drive the display panel 100 to the fan-out lines FOL. The main driving circuit 200 may supply the data voltage to the data lines DL through the fan-out lines FOL. The data voltage may be supplied to the plurality of display pixels SP and may determine luminance of the display pixels SP. The main driving circuit 200 may supply the scan control signal to the display scan driving unit 110 through the gate control line GCL.

The main driving circuit 200 receives the light sensing signals from the light sensing pixels LSP through the light sensing lines ERL, and detects photoplethysmography signals. The photoplethysmography signals may include pulse wave signals, among biological signals, corresponding to changes in the size of light sensing signals.

In addition to the pulse wave signals, the biological signals may further include electromyography signals, brain wave signals, etc. However, hereinafter, an example in which the main driving circuit 200 detects and analyzes the pulse wave signals among the biological signals to measure user's biometric information will be described. The user's biometric information includes information such as blood pressure, heart rate, heart rate variability, respiratory rate, blood vessel elasticity, occurrence of cardiovascular disease, and oxygen saturation.

The main driving circuit 200 may sample and select the pulse wave signals detected by guiding a pulse wave signal detection process to a preset application screen and analyzing the pulse wave signals so that the user's pulse wave signals may be accurately detected. In addition, the main driving circuit 200 measures the biometric information such as blood pressure, heart rate, heart rate variability, respiratory rate, blood vessel elasticity, occurrence of cardiovascular disease, and oxygen saturation by analyzing the pulse wave signals in units of a preset period. Accordingly, the main driving circuit 200 may display, on the application program screen, measurement results of the biometric information such as blood pressure, heart rate, heart rate variability, respiratory rate, blood vessel elasticity, occurrence of cardiovascular disease, and oxygen saturation.

Figure 6:
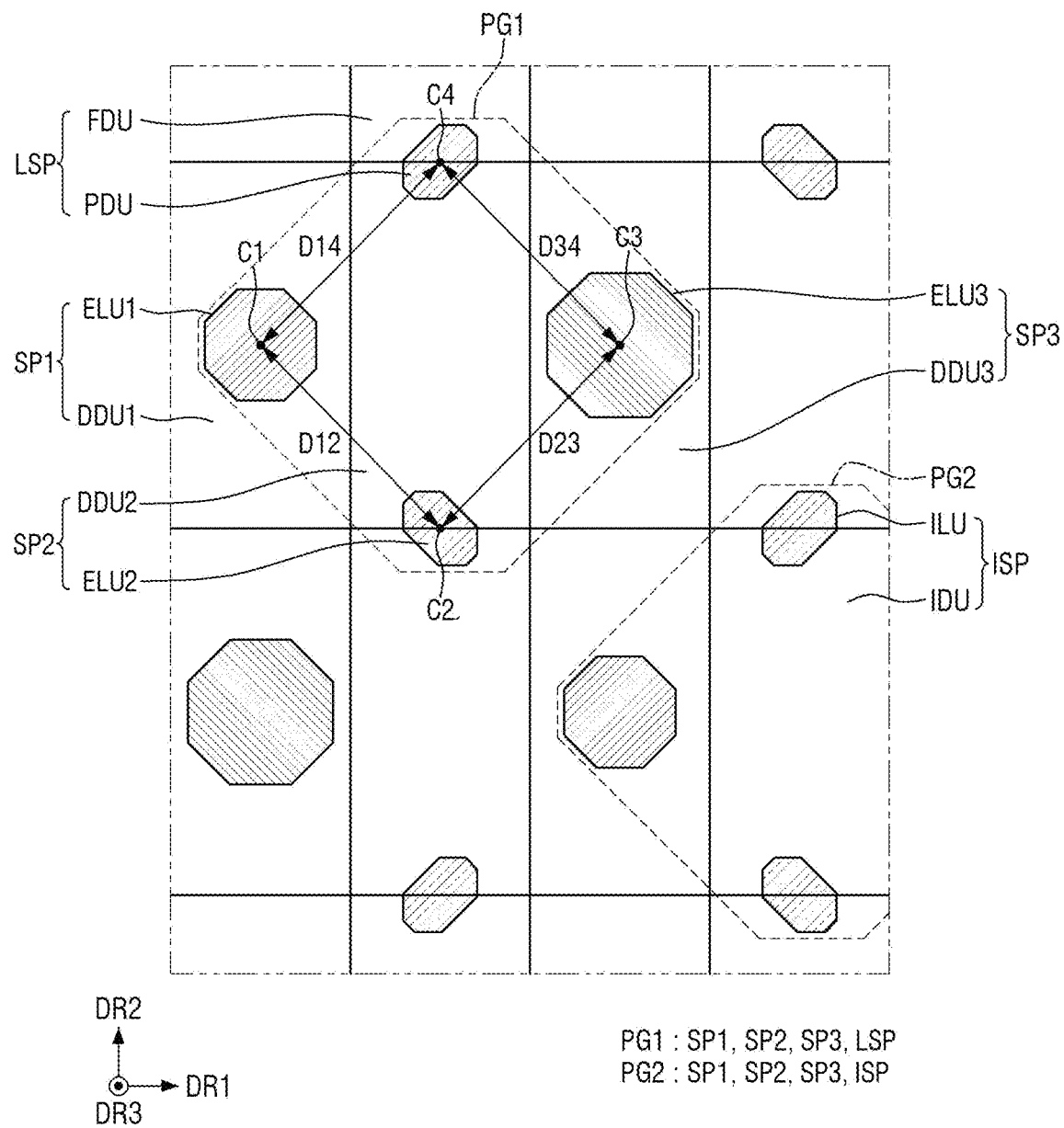
FIG. 6 is a layout view illustrating a display area according to an embodiment.

FIG. 6 is a layout view illustrating a display area according to an embodiment.

Referring to FIG. 6, display pixels SP and light sensing pixels LSP may be disposed and included in the display area DA. In addition, infrared light emitting pixels ISP may be further included and disposed in the display area DA.

The display pixels SP of the display area DA may be divided into first display pixels SP1, second display pixels SP2, and third display pixels SP3.

The first display pixel SP1, the second display pixel SP2, and the third display pixel SP3 as well as the light sensing pixel LSP may be defined as each first unit pixel PG1. In addition, the first display pixel SP1, the second display pixel SP2, and the third display pixel SP3 as well as the infrared light emitting pixel ISP may be defined as each second unit pixel PG2.

The first and second unit pixels PG1 and PG2 may be defined as the smallest unit of display pixels SP capable of displaying white. Each first unit pixel PG1 may sense light. The first unit pixels PG1 and the second unit pixels PG2 are alternately arranged in a zigzag shape on a plane and may also be arranged in a matrix form in one diagonal direction. In addition, the first unit pixels PG1 and the second unit pixels PG2 may be alternately arranged in a matrix form forming horizontal or vertical stripe on a plane.

The first display pixel SP1 may include a first light emitting unit ELU1 emitting first light and a first pixel driving unit DDU1 applying a driving current to a light emitting element of the first light emitting unit ELU1. The first light may be light in a red wavelength band. For example, a main peak wavelength of the first light may be positioned between approximately 600 nm and 750 nm.

The second display pixel SP2 may include a second light emitting unit ELU2 emitting second light and a second pixel driving unit DDU2 applying a driving current to a light emitting element of the second light emitting unit ELU2. The second light may be light in a blue wavelength band. For example, a main peak wavelength of the second light may be positioned between approximately 370 nm and 460 nm.

The third display pixel SP3 may include a third light emitting unit ELU3 emitting third light and a third pixel driving unit DDU3 applying a driving current to a light emitting element of the third light emitting unit ELU3. The third light may be light in a green wavelength band. For example, a main peak wavelength of the third light may be positioned between approximately 480 nm and 560 nm.

The infrared light emitting pixel ISP may include an infrared light emitting unit ILU emitting light in an infrared wavelength band and an infrared pixel driving unit IDU applying a driving current to a light emitting element of the infrared light emitting unit ILU. A main peak wavelength of infrared light may be positioned between approximately 750 nm and 1 mm.

The light sensing pixel LSP includes a light sensing unit PDU and a sensing driving unit FDU.

In the first unit pixel PG1, first to third pixel driving units DDU1 to DDU3 may be disposed in a preset order along the first direction DR1. In some embodiments, any one of the first to third pixel driving units DDU1 to DDU3 may also be disposed along the first direction DR1 with another adjacent pixel driving unit. In addition, the sensing driving unit FDU may be disposed along the first direction DR1 of any one of the first to third pixel driving units DDU1 to DDU3. In some embodiments, the sensing driving unit FDU may also be disposed along the second direction DR2 of any one of the first to third pixel driving units DDU1 to DDU3.

The first pixel driving units DDU1 adjacent to each other in a direction of the data line DL may be disposed along the second direction DR2. The second pixel driving units DDU2 adjacent to each other in the direction of the data line DL may be disposed along the second direction DR2. Likewise, all of the sensing driving units FDU adjacent to each other in the direction of the data line DL may also be disposed along the second direction DR2.

The first light emitting unit ELU1, the second light emitting unit ELU2, the third light emitting unit ELU3, and the infrared light emitting unit ILU may have a square, octagonal, or diamond planar shape, but are not necessarily limited thereto. For example, the first light emitting unit ELU1, the second light emitting unit ELU2, the third light emitting unit ELU3, the infrared light emitting unit ILU, and the light sensing unit PDU may have a polygonal plan shape other than the square, octagon, or diamond.

Meanwhile, due to the arrangement position and planar shape of the first light emitting unit ELU1, the second light emitting unit ELU2, the third light emitting unit ELU3, and the light sensing unit PDU, a distance D12 between a center C1 of the first light emitting unit ELU1 and a center C2 of the second light emitting unit ELU2 adjacent to each other, a distance D23 between a center C2 of the second light emitting unit ELU2 and a center C3 of the third light emitting unit ELU3 adjacent to each other, a distance D14 between the center C1 of the first light emitting unit ELU1 and a center C4 of a light sensing unit PDU adjacent to each other in another direction, and a distance D34 between the center C4 of the light sensing unit PDU and the center C3 of the third light emitting unit ELU3 may be substantially the same.

Figure 7:
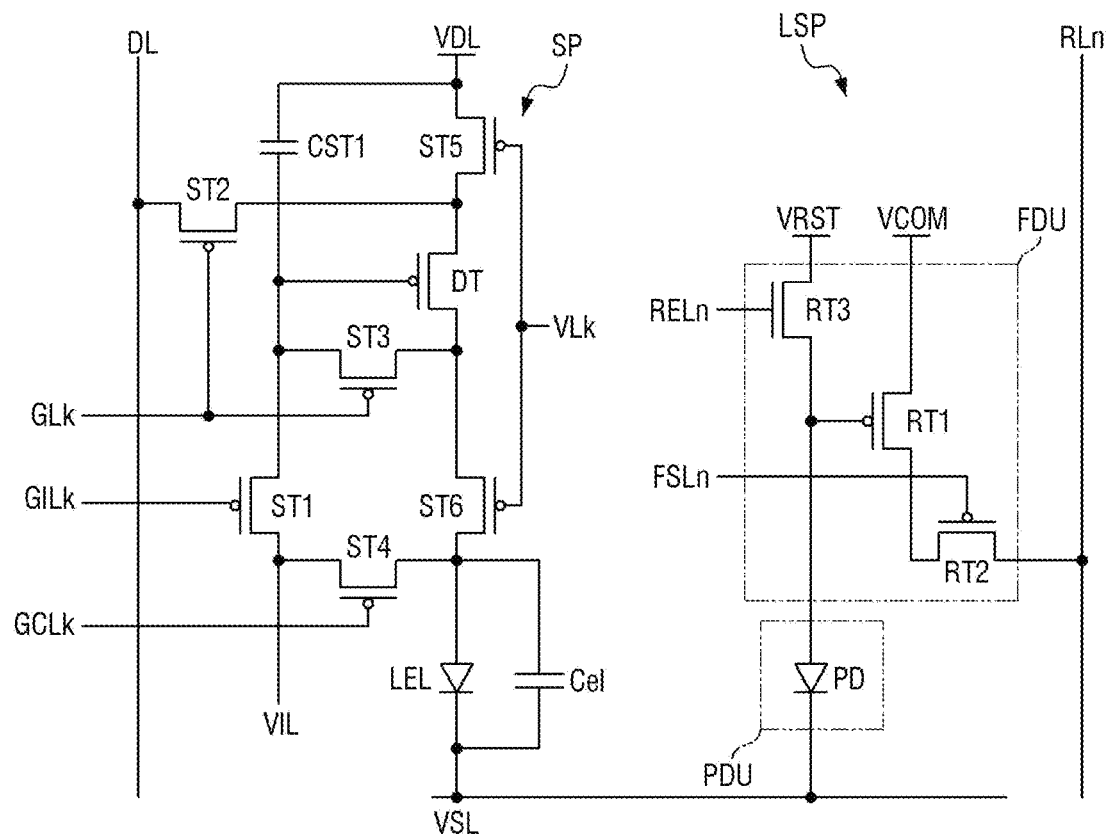
FIG. 7 is a circuit diagram illustrating a display pixel and a light sensing pixel according to an embodiment.

FIG. 7 is a circuit diagram illustrating a display pixel and a light sensing pixel according to an embodiment.

Referring to FIG. 7, each display pixel SP according to an embodiment may be connected to a k-th display initialization line GILk, a k-th display scan line GLk, a k-th display control line GCLk, and a k-th light emitting control line VLK. In addition, the display pixel SP may be connected to a first driving voltage line VDL supplied with a first driving voltage, a second driving voltage line VSL supplied with a second driving voltage, and a third driving voltage line VIL supplied with a third driving voltage. Hereinafter, the letters k and n used in place of numbers are positive integers and may be the same number.

The display pixel SP may include a light emitting unit ELU and a pixel driving unit DDU. The light emitting unit ELU may include a light emitting element LEL. The pixel driving unit DDU may include a driving transistor DT, switch elements, and a capacitor CST1. The switch elements include first to sixth transistors ST1, ST2, ST3, ST4, ST5, and ST6.

The driving transistor DT may include a gate electrode, a first electrode, and a second electrode. The driving transistor DT controls a drain-source current Ids (hereinafter, referred to as a "driving current") flowing between the first electrode and the second electrode based on a data voltage applied to the gate electrode. The driving current Ids flowing through a channel of the driving transistor DT is proportional to a square of a difference between a voltage Vsg between the first electrode and the gate electrode of the driving transistor DT and a threshold voltage as in Equation 1.

$$Ids = k' \times (Vsg - Vth)^2 \qquad \text{[Equation 1]}$$

In Equation 1, k' is a proportional coefficient determined by a structure and physical characteristics of the driving transistor, Vsg is a voltage between the first electrode and the gate electrode of the driving transistor, and Vth is a threshold voltage of the driving transistor.

The light emitting element LEL emits light based on the driving current Ids. For example, as the driving current Ids increases, the amount of light emitted from the light emitting element LEL may increase.

The light emitting element LEL may be an organic light emitting diode including an organic light emitting layer disposed between an anode electrode and a cathode electrode. In some embodiments, the light emitting element LEL may be an inorganic light emitting element including an inorganic semiconductor disposed between the anode electrode and the cathode electrode. In some embodiments, the light emitting element LEL may be a quantum dot light emitting element including a quantum dot light emitting layer disposed between the anode electrode and the cathode electrode. In some embodiments, the light emitting element LEL may be a micro light emitting element including a micro light emitting diode disposed between the anode electrode and the cathode electrode.

The anode electrode of the light emitting element LEL may be connected to a first electrode of the fourth transistor ST4 and a second electrode of the sixth transistor ST6, and the cathode electrode of the light emitting element LEL may be connected to the second driving voltage line VSL. A parasitic capacitance Cel may be formed between the anode electrode and the cathode electrode of the light emitting element LEL.

The first transistor ST1 is turned on by an initialization scan signal of the k-th display initialization line GILk and connect the gate electrode of the driving transistor DT to the third driving voltage line VIL. Accordingly, the third driving voltage VINT of the third driving voltage line VIL may be applied to the gate electrode of the driving transistor DT. A gate electrode of the first transistor ST1 may be connected to the k-th display initialization line GILk, a first electrode thereof may be connected to the gate electrode of the driving transistor DT, and a second electrode thereof may be connected to the third driving voltage line VIL.

The second transistor ST2 is turned on by a display scan signal of the k-th display scan line GLk and connect the first electrode of the driving transistor DT to the data line DL. Accordingly, a data voltage of the data line DL may be applied to the first electrode of the driving transistor DT. A gate electrode of the second transistor ST2 may be connected to the k-th display scan line GLk, a first electrode thereof may be connected to the first electrode of the driving transistor DT, and a second electrode thereof may be connected to the data line DL.

The third transistor ST3 is turned on by the display scan signal of the k-th display scan line GLk and connect the gate electrode and the second electrode of the driving transistor DT to each other. When the gate electrode and the second electrode of the driving transistor DT are connected to each other, the driving transistor DT is driven as a diode. A gate electrode of the third transistor ST3 may be connected to the k-th display scan line GLk, a first electrode thereof may be connected to the second electrode of the driving transistor DT, and a second electrode thereof may be the gate electrode of the driving transistor DT.

The fourth transistor ST4 is turned on by a display control signal of the k-th display control line GCLk and connect the anode electrode of the light emitting element LEL to the third driving voltage line VIL. The third driving voltage of the third driving voltage line VIL may be applied to the anode electrode of the light emitting element LEL. A gate electrode of the fourth transistor ST4 is connected to the k-th display control line GCLk, a first electrode thereof is connected to the anode electrode of the light emitting element LEL, and a second electrode thereof is connected to the third driving voltage line VIL.

The fifth transistor ST5 is turned on by a light emitting signal of the k-th light emitting control line VLk and connect the first electrode of the driving transistor DT to the first driving voltage line VDL. A gate electrode of the fifth transistor ST5 is connected to the k-th light emitting control line VLk, a first electrode thereof is connected to the first driving voltage line VDL, and a second electrode thereof is connected to the first electrode of the driving transistor DT.

The sixth transistor ST6 is disposed between the second electrode of the driving transistor DT and the anode electrode of the light emitting element LEL. The sixth transistor ST6 is turned on by the light emitting control signal of the k-th light emitting control line VLk and connect the second electrode of the driving transistor DT to the anode electrode of the light emitting element LEL. A gate electrode of the sixth transistor ST6 is connected to the k-th light emitting control line VLK, a first electrode thereof is connected to the second electrode of the driving transistor DT, and a second electrode thereof is connected to the anode electrode of the light emitting element LEL.

When both the fifth transistor ST5 and the sixth transistor ST6 are turned on, the driving current Ids of the driving transistor DT based on the data voltage applied to the gate electrode of the driving transistor DT may flow to the light emitting element LEL.

The capacitor CST1 is formed between the gate electrode of the driving transistor DT and the first driving voltage line VDL. A first capacitor electrode of the capacitor CST1 may be connected to the gate electrode of the driving transistor DT, and a second capacitor electrode thereof may be connected to the first driving voltage line VDL.

When the first electrode of each of the first to sixth transistors ST1, ST2, ST3, ST4, ST5, and ST6 and the driving transistor DT are source electrodes, the second electrode thereof may be a drain electrode. Alternatively, when the first electrode of each of the first to sixth transistors ST1, ST2, ST3, ST4, ST5, and ST6 and the driving transistor DT are drain electrodes, the second electrode thereof may be a source electrode.

An active layer of each of the first to sixth transistors ST1, ST2, ST3, ST4, ST5, and ST6 and the driving transistor DT may be formed of any one of poly silicon, amorphous silicon, and an oxide semiconductor. It is mainly described in FIG. 7 that the first to sixth transistors ST1, ST2, ST3, ST4, ST5, and ST6 and the driving transistor DT are formed as P-type metal oxide semiconductor field effect transistors (MOSFETs), but the present disclosure is not necessarily limited thereto. For example, the first to sixth transistors ST1, ST2, ST3, ST4, ST5, and ST6 and the driving transistor DT may be formed as N-type MOSFETs. In some embodiments, at least one of the first to sixth transistors ST1, ST2, ST3, ST4, ST5, and ST6 and the driving transistor DT may be formed as an N-type MOSFET.

The light sensing pixels LSP are electrically connected to an n-th sensing reset line RELn, an n-th light sensing scan line FSLn, and an n-th light sensing line RLn, respectively. Each light sensing pixel LSP may reset by a reset signal from the n-th sensing reset line RELn and may transmit a light sensing signal to each n-th light sensing scan line RLn in response to a sensing scan signal from the n-th light sensing scan line FSLn.

The light sensing pixels LSP may be divided into a light sensing unit PDU including a light sensing element PD, and a sensing driving unit FDU including first to third sensing transistors RT1 to RT3 and a sensing capacitor. Here, the sensing capacitor may be formed in a parallel structure with the light sensing element PD.

The first sensing transistor RT1 of the sensing driving unit FDU may cause a light sensing current to flow based on the voltage of the light sensing element PD and the sensing capacitor. For example, the amount of light sensing current may vary depending on the voltage applied to the light sensing element PD and the sensing capacitor. A gate electrode of the first sensing transistor RT1 may be connected to a second electrode of the light sensing element PD. A first electrode of the first sensing transistor RT1 may be connected to a common voltage source VCOM to which a common voltage is applied. A second electrode of the first sensing transistor RT1 may be connected to a first electrode of the second sensing transistor RT2.

When a sensing scan signal of a gate-on voltage is applied to the n-th light sensing scan line FSLn, the second sensing transistor RT2 may cause the sensing current of the first sensing transistor RT1 to flow through the n-th light sensing line RLn. In this case, the n-th light sensing line RLn may be charged to the sensing voltage by the sensing current. The gate electrode of the second sensing transistor RT2 may connected to the n-th light sensing scan line FSLn, the first electrode thereof may be connected to the second electrode of the first sensing transistor RT1, and the second electrode thereof may be connected to the n-th light sensing line RLn.

When the reset signal of the gate-on voltage is applied to the n-th sensing reset line RELn, the third sensing transistor RT3 may reset the voltage of the light sensing element PD and the sensing capacitor to the reset voltage of the reset voltage source VRST. The gate electrode of the third sensing transistor RT3 may be connected to the sensing reset line REL, the first electrode thereof may be connected to the reset voltage source VRST, and the second electrode thereof may be connected to the second electrode of the light sensing element PD.

It is mainly described in FIG. 7 that the first sensing transistor RT1 and the second sensing transistor RT2 are formed as the P-type metal oxide semiconductor field effect transistor (MOSFETs), and the third sensing transistor RT3 is formed as the N-type MOSFET, but the embodiment of the present disclosure is not necessarily limited thereto. For example, the first sensing transistor RT1, the second sensing transistor RT2, and the third sensing transistor RT3 may be optionally formed of the same or different types. In addition, one of the first and second electrodes of each of the first sensing transistor RT1, the second sensing transistor RT2, and the third sensing transistor RT3 may be a source electrode, and the other may be drain electrodes.

Figure 8:
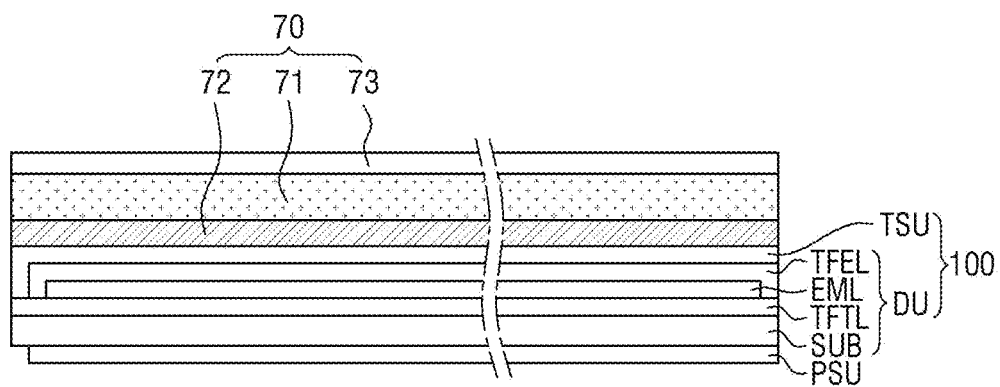
FIG. 8 is a cross-sectional view illustrating a structure in which a display panel and a reflective plate of the display device illustrated in FIG. 1 are disposed along a first direction, according to an embodiment.

FIG. 8 is a cross-sectional view illustrating a structure in which a display panel and a reflective plate of the display device illustrated in FIG. 1 are disposed along a first direction, according to an embodiment.

When inspecting the light detection characteristics of the display panel 100, the display device 10 is loaded on the loading plate 20 of the inspection device. In addition, the display device 10 is electrically connected to the light characteristics inspection control unit 80 through at least one connector and cable.

When inspecting the light detection characteristics of the display panel 100, the plate arrangement unit 50 of the inspection device supports both side surfaces, the front surface, or the rear surface of the reflective plate 70 and seats the reflective plate 70 on the front surface of the display panel 100.

The reflective plate 70 includes a base substrate 71, a first reflective layer 72 formed on a front surface, which is one surface of the base substrate 71, and a second reflective layer 73 formed on a rear surface, which is the other surface of the base substrate 71. The base substrate 71 may be disposed between the first reflective layer 72 and the second reflective layer 73.

The first reflective layer 72 and the second reflective layer 73 may have different light reflectances. The base substrate 71 may be formed of opaque or translucent acrylic.

Here, the first reflective layer 72 may be formed to entirely cover the front direction of the base substrate 71 with a dark black color to have a light reflectance of any one of 5% to 30%. On the other hand, the second reflective layer 73 may be formed to entirely cover the rear direction of the base substrate 71 with a bright white color to have a light reflectance of any one of 70% to 95%.

The plate arrangement unit 50 may support both side surfaces or the front or rear surface of the reflective plate 70 and switch the arrangement direction of the reflective plate 70 to the first or second direction. Accordingly, the plate arrangement unit 50 arranges the reflective plate 70 along the first direction so that the first reflective layer 72 of the reflective plate 70 faces the front surface of the display panel 100 or arranges the reflective plate 70 along the second direction so that the second reflective layer 73 of the reflective plate 70 faces the front surface of the display panel 100.

When inspecting the light detection characteristics of the display panel 100, the plate arrangement unit 50 first arranges the reflective plate 70 on the front surface of the display panel 100 along the first direction so that the first reflective layer 72 of the reflective plate 70 faces the front surface of the display panel 100.

Figure 9:
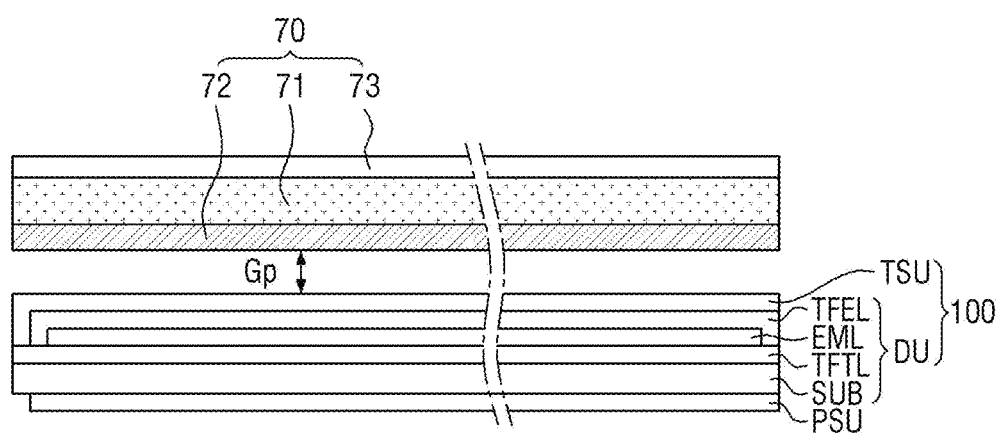
FIG. 9 is a cross-sectional view illustrating a structure in which a display panel and a reflective plate of the display device illustrated in FIG. 1 are disposed along a first direction, according to an embodiment.

FIG. 9 is a cross-sectional view illustrating a structure in which a display panel and a reflective plate of the display device illustrated in FIG. 1 are disposed along a first direction, according to an embodiment.

Referring to FIG. 9, when inspecting the light detection characteristics of the display panel 100, the plate arrangement unit 50 may support both side surfaces, or the front or rear surface of the reflective plate 70 and arrange the reflective plate 70 in the front direction of the display panel along the first or second direction. In this case, the plate arrangement unit 50 may arrange the reflective plate 70 along the first direction so that the first reflective layer 72 of the reflective plate 70 faces the front surface of the display panel 100 or arrange the reflective plate 70 along the second direction so that the second reflective layer 73 of the reflective plate 70 faces the front surface of the display panel 100, and may arrange and fix the reflective plate 70 in a front direction facing the display panel 100 in parallel with the display panel 100 while maintaining a preset gap Gp.

When inspecting the light detection characteristics of the display panel 100, the plate arrangement unit 50 may arrange the reflective plate 70 along the first direction so that the first reflective layer 72 of the reflective plate 70 faces the front surface of the display panel 100, or may first arrange and fix the reflective plate 70 in the front direction facing the display panel 100 in parallel with the display panel 100 while maintaining a preset gap Gp.

Figure 10:
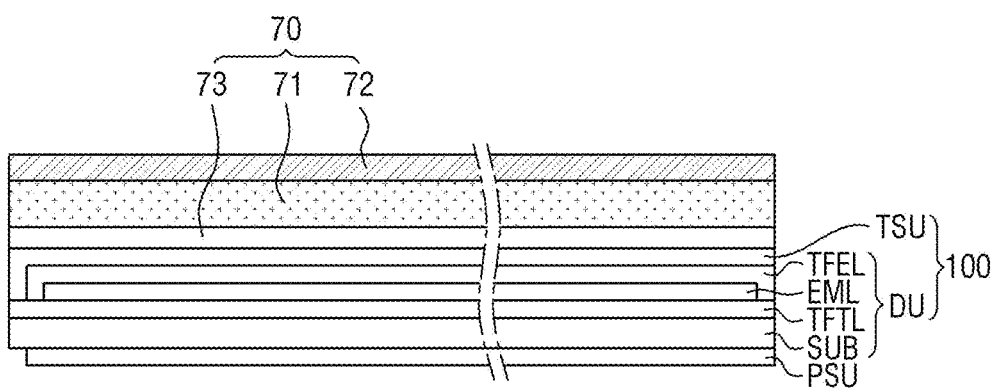
FIG. 10 is a cross-sectional view illustrating a structure in which a display panel and a reflective plate of the display device illustrated in FIG. 1 are disposed in a second direction, according to an embodiment.

FIG. 10 is a cross-sectional view illustrating a structure in which a display panel and a reflective plate of the display device illustrated in FIG. 1 are disposed along a second direction, according to an embodiment.

Referring to FIG. 10, the plate arrangement unit 50 may support both side surfaces, or the front or rear surface of the reflective plate 70 and arrange the reflective plate 70 along the first direction so that the first reflective layer 72 of the reflective plate 70 faces the front surface of the display panel 100, or arrange the reflective plate 70 along the second direction so that the second reflective layer 73 of the reflective plate 70 faces the front surface of the display panel 100.

Accordingly, when inspecting the light detection characteristics of the display panel 100, the plate arrangement unit 50 may arrange the reflective plate 70 along the second direction so that the second reflective layer 73 of the reflective plate 70 faces the front surface of the display panel 100, and may arrange the reflective plate 70 on the front surface of the display panel 100 along the second direction.

Figure 11:
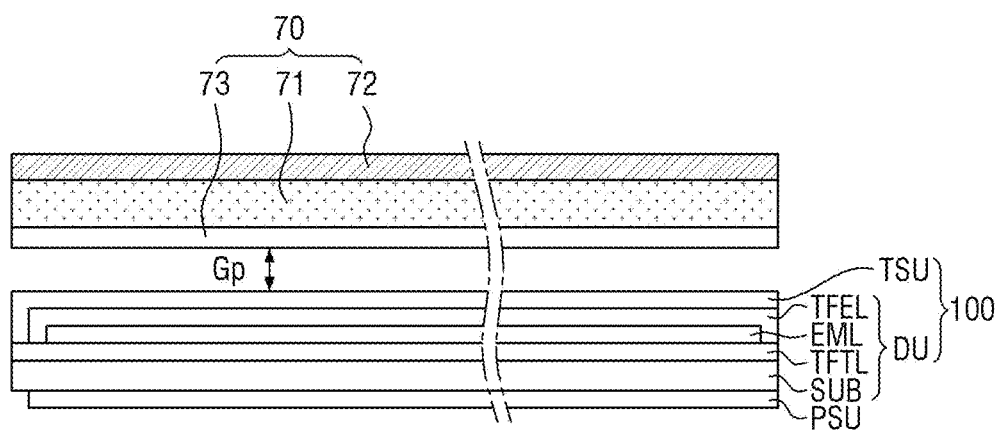
FIG. 11 is a cross-sectional view illustrating a structure in which a display panel and a reflective plate of the display device illustrated in FIG. 1 are disposed in a second direction, according to an embodiment.

FIG. 11 is a cross-sectional view illustrating a structure in which a display panel and a reflective plate of the display device illustrated in FIG. 1 are disposed in a second direction, according to an embodiment.

Referring to FIG. 11, the plate arrangement unit 50 may arrange and fix the reflective plate 70 in the front direction facing the display panel 100 in parallel with the display panel 100 while maintaining a preset gap Gp.

Accordingly, when inspecting the light detection characteristics of the display panel 100, the plate arrangement unit 50 may switch the reflective plate 70 along the second direction so that the second reflective layer 73 of the reflective plate 70 faces the front surface of the display panel 100, and may arrange and fix the reflective plate 70 switched along the second direction in the front direction facing the display panel 100 in parallel with the display panel 100 while maintaining a preset gap Gp.

Figure 12:
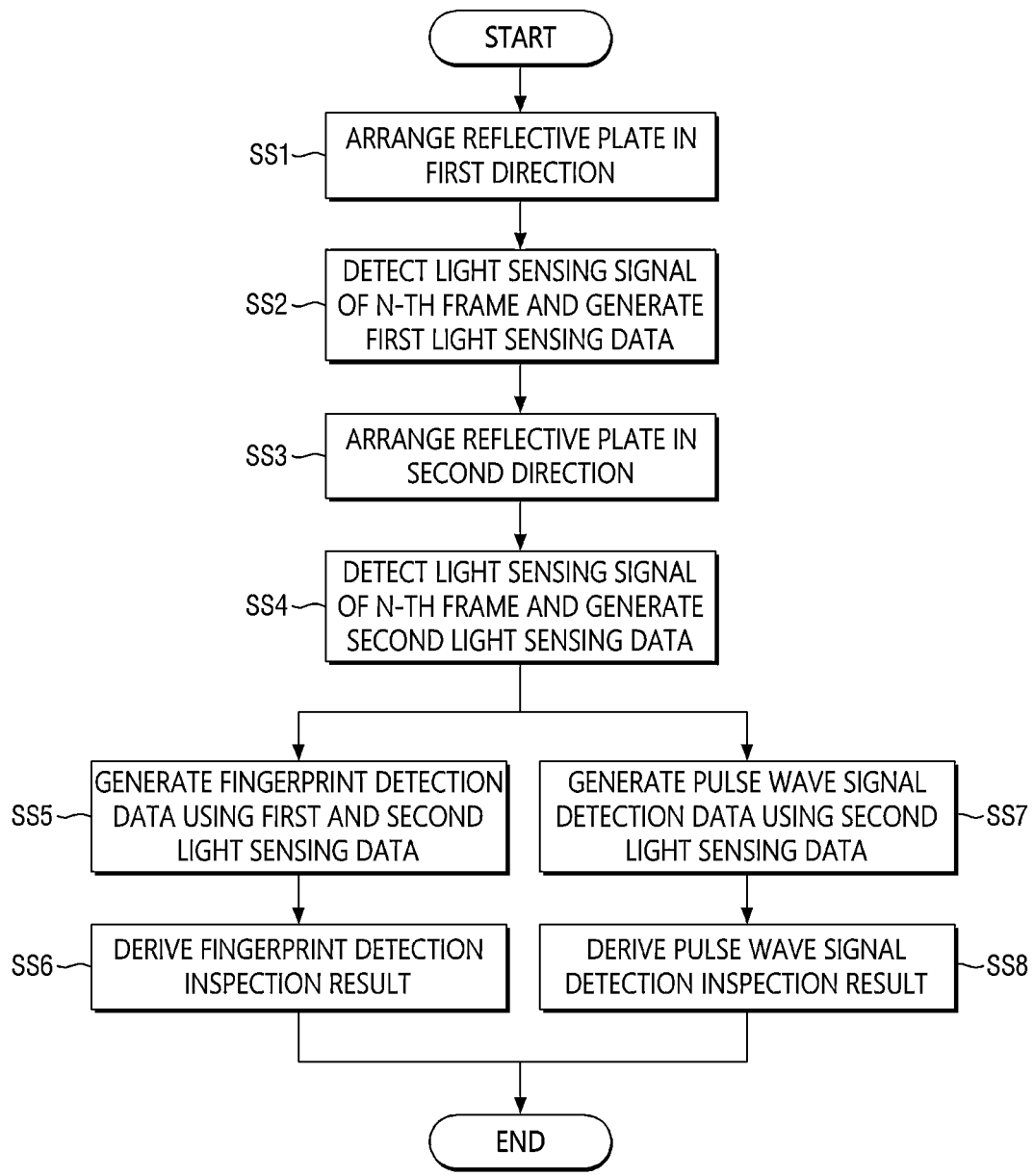
FIG. 12 is a flowchart sequentially illustrating a method for inspecting light detection characteristics of a display panel according to an embodiment.

FIG. 12 is a flowchart sequentially illustrating a method for inspecting light detection characteristics of a display panel according to an embodiment.

Referring to FIG. 12, when inspecting the light detection characteristics of the display panel 100, the display device 10 is loaded on the loading plate 20 of the inspection device. In addition, the display device 10 is electrically connected to the light characteristics inspection control unit 80 through at least one connector and cable.

The plate arrangement unit 50 first arranges the reflective plate 70 on the front surface of the display panel 100 along the first direction so that the first reflective layer 72 of the reflective plate 70 faces the front surface of the display panel 100. In this case, the plate arrangement unit 50 may first arrange and fix the reflective plate 70 in the front direction facing the display panel 100 while maintaining a preset gap Gp (SS1).

Figure 13:
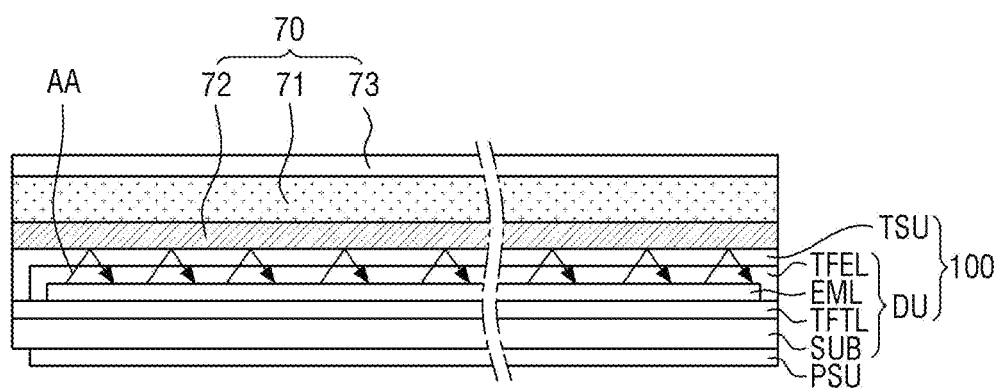
FIG. 13 is a cross-sectional structural view illustrating a process of detecting a light sensing signal using a reflective plate disposed along a first direction.

FIG. 13 is a cross-sectional structural view illustrating a process of detecting a light sensing signal using a reflective plate disposed along a first direction.

Referring to FIG. 13, with the reflective plate 70 seated or disposed on the front surface of the display panel 100 along the first direction, the light characteristics inspection control unit 80 supplies driving control signals for controlling the driving timing of the display pixels SP and light sensing pixels LSP of the display panel 100, light emitting data that sets the light emitting luminance of display pixels SP, high and low potential driving voltages, etc. to the main driving circuit 200 of the display device 10.

The main driving circuit 200 of the display device 10 receives the driving control signals, the light emitting data, the high and low potential driving voltages, etc. from the light characteristics inspection control unit 80.

The main driving circuit 200 generates control signals and drives the display pixels SP and light sensing pixels LSP of the display panel 100 based on the driving timing of the driving control signals. In addition, the main driving circuit 200 generates a data voltage that corresponds to the light emitting data from the light characteristics inspection control unit 80 and supplies the data voltage to the display pixels SP. As illustrated by arrows AA, light emitted by the display pixels SP may be reflected by the first reflective layer 72 of the reflective plate 70 and applied to the light sensing pixels LSP. Accordingly, the main driving circuit 200 controls the driving timing of the light sensing pixels LSP while the display pixels SP emit light and receives light sensing signals from each light sensing pixel LSP. The main driving circuit 200 sequentially supplies the light sensing signals received from each light sensing pixel LSP to the light characteristics inspection control unit 80. The light characteristics inspection control unit 80 converts the light sensing signals received through the display device 10 into digital data in units of at least one frame and generates first light sensing data in units of at least one frame (SS2).

The light characteristics inspection control unit 80 may check and inspect the light detection characteristics of the light sensing pixels LSP such as linear light detection characteristics and dynamic range of the light sensing pixels LSP by graphing or databasing the first light sensing data in units of at least one frame period in which the light emitting luminance is variable.

Figure 14:
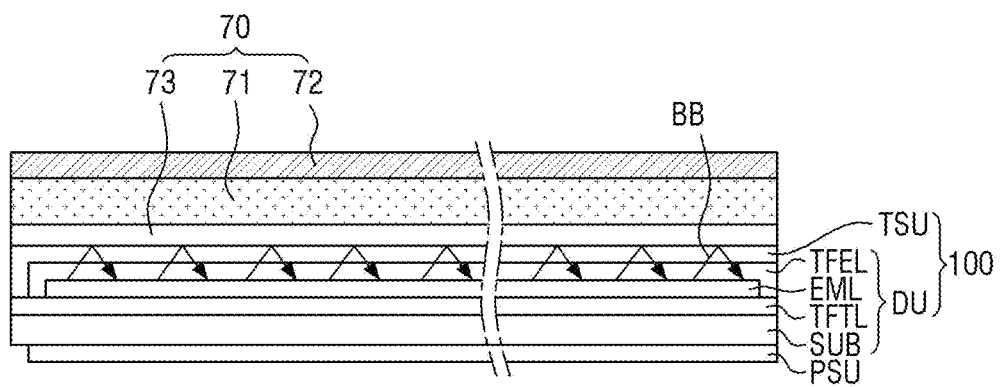
FIG. 14 is a cross-sectional structural view illustrating a process of detecting a light sensing signal using a reflective plate disposed in a second direction.

FIG. 14 is a cross-sectional structural view illustrating a process of detecting a light sensing signal using a reflective plate disposed along a second direction.

Referring to FIG. 14, the plate arrangement unit 50 arranges the reflective plate 70 along the second direction so that the second reflective layer 73 of the reflective plate 70 faces the front surface of the display panel 100, and arranges the reflective plate 70 on the front surface of the display panel 100. Here, the plate arrangement unit 50 may also arrange and fix the reflective plate 70 arranged along the second direction in the front direction facing the display panel 100 in parallel with the display panel 100 while maintaining a preset gap Gp (SS3).

With the reflective plate 70 seated or arranged on the front surface of the display panel 100 along the second direction, the light characteristics inspection control unit 80 supplies driving control signals, light emitting data, high and low potential driving voltages, etc. to the main driving circuit 200 of the display device 10.

The main driving circuit 200 generates control signals and drives the display pixels SP and light sensing pixels LSP of the display panel 100 based on the driving timing of the driving control signals. In addition, the main driving circuit 200 generates a data voltage that corresponds to the light emitting data from the light characteristics inspection control unit 80 and supplies the data voltage to the display pixels SP. As illustrated by arrows BB, light emitted by the display pixels SP may be reflected by the second reflective layer 73 of the reflective plate 70 and applied to the light sensing pixels LSP. Accordingly, the main driving circuit 200 controls the driving timing of the light sensing pixels LSP while the display pixels SP emit light and receives light sensing signals from each light sensing pixel LSP. The main driving circuit 200 supplies the light sensing signals received from each light sensing pixel LSP to the light characteristics inspection control unit 80. The light characteristics inspection control unit 80 converts the light sensing signals received through the display device 10 into digital data in units of at least one frame and generates second light sensing data in units of at least one frame (SS4).

The light characteristics inspection control unit 80 may check and inspect the light detection characteristics of the light sensing pixels LSP such as linear light detection characteristics and dynamic range of the light sensing pixels LSP by graphing or databasing the second light sensing data in units of at least one frame period in which the light emitting luminance is variable.

Figure 15:
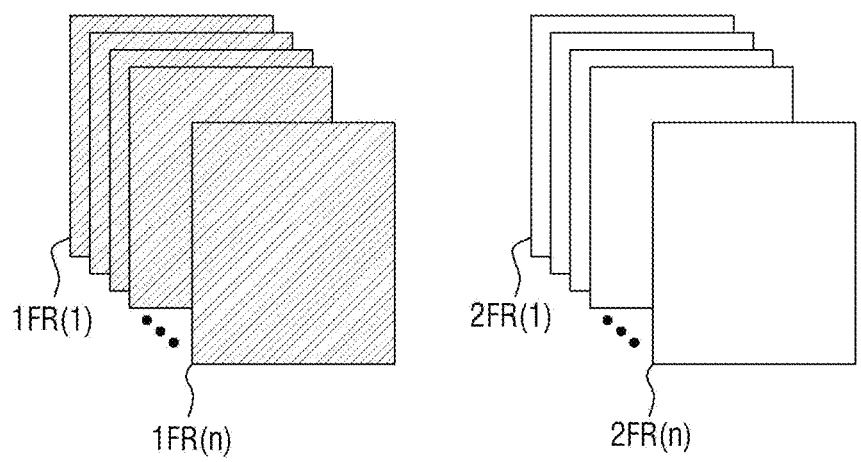
FIG. 15 is a view illustrating a method of deriving light detection characteristics inspection results using first and second light sensing data.

FIG. 15 is a view illustrating a method of deriving light detection characteristics inspection results using first and second light sensing data.

With the reflective plate 70 arranged along the first direction so that the front surface of the display panel 100 and the first reflective layer 72 of the reflective plate 70 face each other, the light characteristics inspection control unit 80 drives the display device 10 and converts the light sensing signals detected through the display panel 100 into digital data in units of at least one frame and generate first light sensing data 1FR (1) to 1FR (n) in units of at least one frame.

For example, with the reflective plate 70 arranged along the first direction so that the front surface of the display panel 100 and the first reflective layer 72 of the reflective plate 70 face each other, the light characteristics inspection control unit 80 may drive the display device 10 and generate first light sensing data 1FR (1) to 1FR (n) of first to n-th frames.

In addition, with the reflective plate 70 arranged along the second direction DR2 so that the front surface of the display panel 100 and the second reflective layer 73 of the reflective plate 70 face each other, the light characteristics inspection control unit 80 may drive the display device 10 and generate second light sensing data 2FR (1) to 2FR (n) of the first to n-th frames.

The light characteristics inspection control unit 80 compares the first light sensing data 1FR (1) to 1FR (n) of the first to n-th frames and the second light sensing data 2FR (1) to 2FR (n) of the first to n-th frames, and generates fingerprint detection data for each of the first to n-th frame using a difference data value for each of the compared first to n-th frame (SS5).

For example, the light characteristics inspection control unit 80 may generate fingerprint detection data (n) Frame SNR (finger print) for each of the first to n-th frame using Equation 2 below.

$$(n)\text{Frame } SNR(\text{finger print}) = (1FR(n)) - (2FR(n))/\text{Time noise} \quad \text{[Equation 2]}$$

Here, 1FR (n) is the first light sensing data of the n-th frame, and 2FR (n) is the second light sensing data of the n-th frame. In addition, n is a positive integer excluding 0.

Referring to Equation 2, the light characteristics inspection control unit 80 may detect difference data values between the first light sensing data 1FR (n) for each n-th frame detected during the period in which the reflective plate 70 is arranged along the first direction, and the second light sensing data 2FR (n) for each n-th frame detected during the period in which the reflective plate 70 is arranged along the second direction, as fingerprint detection data (n) Frame SNR (finger print) for each of the first to n-th frames.

The light characteristics inspection control unit 80 may compare the fingerprint detection data (n) Frame SNR (finger print) for each of the first to n-th frame with preset reference frame data, and determine whether the display device 10 is a good product based on the comparison result (SS6).

For example, when the light characteristics inspection control unit 80 compares the fingerprint detection data (n) Frame SNR (finger print) for each of the first to n-th frame with the preset reference frame data and the fingerprint detection data (n) Frame SNR (finger print) with lower data values than data values of the reference frame data is detected in more than the number of reference frames (e.g., 10 frames), the light characteristics inspection control unit 80 may determine that the display device 10 is a defective product.

In some embodiments, when the light characteristics inspection control unit 80 compares average data values of the fingerprint detection data (n) Frame SNR (finger print) for each of the first to n-th frame with an average data value of a reference frame and the number of frames of the average data values that are detected to be lower than the average data value of the reference frame is detected to be more than the number of reference frames (e.g., 10 frames), the light characteristics inspection control unit 80 may determine that the display device 10 is a defective product.

Meanwhile, the light characteristics inspection control unit 80 may check and inspect the light detection characteristics of the light sensing pixels LSP such as linear light detection characteristics and dynamic range of the light sensing pixels LSP by graphing or databasing the fingerprint detection data (n) Frame SNR (finger print) for each of the first to n-th frame.

In addition, while detecting and analyzing the fingerprint detection data, the light characteristics inspection control unit 80 generates pulse wave signal detection data for each n-th frame by calculating an average data value for the second light sensing data 2FR (1) to 2FR (n) of the first to n-th frames and comparing and analyzing the second light detection data 2FR (1) to 2FR (n) and preset standard signal values (SS7).

For example, the light characteristics inspection control unit 80 may generate pulse wave signal detection data (n) Frame SNR (PPG) for each n-th frame using Equation 3 below.

$$(n)\text{Frame } SNR(PPG) = \text{Average } 2FR(n)/\text{Standard Signal Value} \quad \text{[Equation 3]}$$

Here, Average 2FR (n) is the average data value of the second light sensing data 2FR (1) to 2FR (n), and Standard Data Value may be preset standard signal values.

The light characteristics inspection control unit 80 may generate the pulse wave signal detection data (n) Frame SNR (PPG) for each n-th frame by calculating the average data value Average 2FR (n) of the second light sensing data 2FR (1) to 2FR (n) and the preset standard signal value (Standard Data Value) using a preset Equation (e.g., Equation 3).

Thereafter, the light characteristics inspection control unit 80 may compare the pulse wave signal detection data (n) Frame SNR (PPG) for each n-th frame with the preset reference frame data and determine whether the display device 10 is a good product based on the comparison result (SS8).

For example, when the light characteristics inspection control unit 80 compares the pulse wave signal detection data (n) Frame SNR (PPG) for each n-th frame with the preset reference frame data and the pulse wave signal detection data (n) Frame SNR (PPG) for each n-th frame having lower data values than the data values of the reference frame data is detected in more than the number of reference frames (e.g., 10 frames), the light characteristics inspection control unit 80 may determine that the display device 10 is a defective product.

As another example, when the light characteristics inspection control unit 80 compares an average data value of the pulse wave signal detection data (n) Frame SNR (PPG) for each n-th frame with an average data value of the reference frame and the average value of the pulse wave signal detection data (n) Frame SNR (PPG) for each n-th frame is detected to be lower than the average data value of the reference frame, the light characteristics inspection control unit 80 may determine that the display device 10 is a defective product.

Meanwhile, the light characteristics inspection control unit 80 may check and inspect the light detection characteristics of the light sensing pixels LSP such as linear light detection characteristics and dynamic range of the light sensing pixels LSP by graphing or databasing the pulse wave signal detection data (n) Frame SNR (PPG) for each n-th frame.

As described above, the display panel inspection device according to an embodiment may improve light detection characteristics inspection speed and inspection efficiency for each display panel by simultaneously evaluating the light detection characteristics for detecting the user's fingerprint and the light detection characteristics for detecting the pulse wave signals for each display panel.

In addition, the display panel inspection device according to an embodiment may increase the accuracy and reliability of the light detection characteristics inspection results by evaluating the light detection characteristics of each display panel and even determining whether or not the display device is a good product using the light sensing signal detection result data for each display device.

In concluding the detailed description, those skilled in the art will appreciate that many variations and modifications can be made to the described embodiments without substantially departing from the principles of the present disclosure.

What is claimed is:

1. An inspection device, comprising:
   a loading plate on which a display device is disposed;
   a reflective plate disposed along a first or second direction to face a display panel of the display device, the reflective plate configured to reflect light generated from display pixels of the display panel back to the display device to be sensed by light sensing pixels of the display panel; and
   a light characteristics inspection control unit controlling a light emitting driving of the display pixels of the display panel and detecting light sensing signals through the light sensing pixels of the display panel to inspect light detection characteristics of the display panel,
   wherein the light characteristics inspection control unit is configured to inspect the light detection characteristics of the display panel by converting the light sensing signals into light sensing data in units of at least one frame and comparing the light sensing data in units of at least one frame with reference frame data.

2. The inspection device of claim 1, further comprising:
   a plate arrangement unit switching an arrangement direction of the reflective plate to the first direction or the second direction and arranging the reflective plate in a front direction of the display panel; and
   a chamber forming an internal space in which the loading plate, the reflective plate, and the plate arrangement unit are disposed, and creating a dark room environment in the internal space.

3. The inspection device of claim 2, wherein the reflective plate includes:
   a flat base substrate;
   a first reflective layer formed on a front surface, which is one surface of the base substrate; and
   a second reflective layer formed on a rear surface, which is another surface of the base substrate, and
   the first reflective layer and the second reflective layer have different light reflectances.

4. The inspection device of claim 3, wherein the first reflective layer entirely covers a front direction of the base substrate with a black color having a light reflectance between 5% to 30%, and
   wherein the second reflective layer entirely covers a rear direction of the base substrate with a white color having a light reflectance between 70% to 95%.

5. The inspection device of claim 3, wherein the plate arrangement unit arranges the reflective plate along the first direction so that the first reflective layer of the reflective plate faces a front surface of the display panel and arranges the reflective plate along the second direction so that the second reflective layer of the reflective plate faces the front surface of the display panel by switching the arrangement direction of the reflective plate.

6. The inspection device of claim 5, wherein the plate arrangement unit seats the reflective plate on the front surface of the display panel by arranging the reflective plate along the first direction or arranges and fixes the reflective plate to be in parallel with the display panel in the front direction facing the display panel while maintaining a gap.

7. The inspection device of claim 6, wherein the plate arrangement unit switches the arrangement of the reflective plate along the second direction and seats the reflective plate switched along the second direction on the front surface of the display panel or arranges and fixes the reflective plate switched along the second direction to be in parallel with the display panel in the front direction facing the display panel while maintaining a gap.

8. The inspection device of claim 5, wherein the light characteristics inspection control unit:
configured to drive the display device with the reflective plate arranged along the first direction so that the first reflective layer of the reflective plate faces the front direction of the display panel,
configured to generate first light sensing data in units of at least one frame by converting the light sensing signals detected through the display panel into digital data in units of at least one frame,
drives the display device again with the reflective plate arranged along the second direction so that the second reflective layer of the reflective plate faces the front direction of the display panel, and
generates second light sensing data in units of at least one frame by converting the light sensing signals detected again through the display panel into digital data in units of at least one frame.

9. The inspection device of claim 8, wherein the light characteristics inspection control unit compares the first light sensing data and the second light sensing data for each of the first to n-th frames and generates fingerprint detection data for each of the first to n-th frame using a difference data value for each of the compared first to n-th frame, wherein n is a positive integer.

10. The inspection device of claim 9, wherein the light characteristics inspection control unit each compares the fingerprint detection data for each of the first to n-th frames with reference frame data and determines whether the display device is defective by analyzing the difference data values according to the comparison result.

11. The inspection device of claim 8, wherein the light characteristics inspection control unit generates pulse wave signal detection data for each n-th frame by calculating an average data value for the second light sensing data and comparing and analyzing the second light sensing data with standard signal values, wherein n is a positive integer.

12. The inspection device of claim 11, wherein the light characteristics inspection control unit each compares the pulse wave detection data for each n-th frame with reference frame data and determines whether the display device is defective by analyzing the difference data values according to the comparison result.

13. An inspection device, comprising:
a loading plate on which a display device is disposed;
a reflective plate disposed along a first or second direction to face a display panel of the display device;
a light characteristics inspection control unit controlling a light emitting driving of the display panel and detecting light sensing signals through the display panel to inspect light detection characteristics of the display panel;
a plate arrangement unit switching an arrangement direction of the reflective plate to the first direction or the second direction and arranging the reflective plate in a front direction of the display panel; and
a chamber forming an internal space in which the loading plate, the reflective plate, and the plate arrangement unit are disposed, and creating a dark room environment in the internal space,
wherein the light characteristics inspection control unit inspects the light detection characteristics of the display panel by converting the light sensing signals into light sensing data in units of at least one frame and comparing the light sensing data in units of at least one frame with reference frame data.

14. The inspection device of claim 13, wherein the reflective plate includes:
a flat base substrate;
a first reflective layer formed on a front surface, which is one surface of the base substrate; and
a second reflective layer formed on a rear surface, which is the other surface of the base substrate, and
wherein the first reflective layer and the second reflective layer have different light reflectances.

15. The inspection device of claim 14, wherein the plate arrangement unit arranges the reflective plate along the first direction so that the first reflective layer of the reflective plate faces a front surface of the display panel and arranges the reflective plate along the second direction so that the second reflective layer of the reflective plate faces the front surface of the display panel by switching the arrangement direction of the reflective plate.

16. An inspection device, comprising:
a loading plate on which a display device is disposed;
a reflective plate disposed along a first or second direction to face a display panel of the display device,
wherein the reflective plate includes:
a flat base substrate;
a first reflective layer formed on a front surface; and
a second reflective layer formed on a rear surface;
a light characteristics inspection control unit controlling a light emitting driving of the display panel and detecting light sensing signals through the display panel to inspect light detection characteristics of the display panel;
a plate arrangement unit switching an arrangement direction of the reflective plate to the first direction or the second direction and arranging the reflective plate in a front direction of the display panel; and
a chamber forming an internal space in which the loading plate, the reflective plate, and the plate arrangement unit are disposed, and creating a dark room environment in the internal space.

17. The inspection device of claim 16, wherein the first reflective layer and the second reflective layer have different light reflectances.

18. The inspection device of claim 16, wherein the light characteristics inspection control unit is configured to inspect the light detection characteristics of the display panel by converting the light sensing signals into light sensing data in units of at least one frame and comparing the light sensing data in units of at least one frame with reference frame data.

19. The inspection device of claim 16, wherein the plate arrangement unit arranges the reflective plate along the first direction so that the first reflective layer of the reflective plate faces a front surface of the display panel and arranges the reflective plate along the second direction so that the second reflective layer of the reflective plate faces the front surface of the display panel by switching the arrangement direction of the reflective plate.

20. The inspection device of claim 17, wherein the first reflective layer has a light reflectance between 5% to 30%, and
wherein the second reflective layer has a light reflectance between 70% to 95%.

* * * * *